US009311772B2

(12) United States Patent
Nguyen et al.

(10) Patent No.: US 9,311,772 B2
(45) Date of Patent: Apr. 12, 2016

(54) JACKPOT INTERFACES AND SERVICES ON A GAMING MACHINE

(71) Applicant: IGT, Las Vegas, NV (US)

(72) Inventors: Binh T. Nguyen, Reno, NV (US); Craig A. Paulsen, Reno, NV (US)

(73) Assignee: IGT, Las Vegas, NV (US)

( * ) Notice: Subject to any disclaimer, the term of this patent is extended or adjusted under 35 U.S.C. 154(b) by 112 days.

(21) Appl. No.: 14/101,098

(22) Filed: Dec. 9, 2013

(65) Prior Publication Data

US 2014/0094292 A1 Apr. 3, 2014

Related U.S. Application Data

(63) Continuation of application No. 11/064,217, filed on Feb. 22, 2005, now Pat. No. 8,602,882, which is a continuation-in-part of application No. 10/958,843, filed on Oct. 4, 2004, now Pat. No. 7,862,427.

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ............ *G07F 17/3211* (2013.01); *G07F 17/32* (2013.01); *G07F 17/3225* (2013.01); *G07F 17/3227* (2013.01); *G07F 17/3239* (2013.01); *G07F 17/3258* (2013.01); *G07F 17/3262* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 3,662,105 | A | 5/1972 | Hurst et al. |
| 4,071,689 | A | 1/1978 | Talmage et al. |
| 4,335,809 | A | 6/1982 | Wain |
| 4,342,454 | A | 8/1982 | Baer et al. |
| 4,356,391 | A | 10/1982 | Takeda |
| 4,689,742 | A | 8/1987 | Troy et al. |
| 4,695,053 | A | 9/1987 | Vazquez, Jr. et al. |
| 4,764,666 | A | 8/1988 | Bergeron |
| 4,837,728 | A | 6/1989 | Barrie et al. |

(Continued)

FOREIGN PATENT DOCUMENTS

| | | |
|---|---|---|
| AU | 704 691 | 4/1997 |
| DE | 4403688 A1 | 8/1995 |

(Continued)

OTHER PUBLICATIONS

Notice of Allowance dated Aug. 27, 2010 from U.S. Appl. No. 10/958,843.

(Continued)

*Primary Examiner* — Paul A D'Agostino

(74) *Attorney, Agent, or Firm* — Neal, Gerber & Eisenberg LLP

(57) ABSTRACT

A disclosed a player tracking unit provides a touch screen display with a touch screen controller integrated into the touch screen sensor assembly. Game service interfaces may be presented on the touch screen display that allow a user to obtain one or more game services. With the touch screen sensor, a user may navigate through the game service interface and supply information required to obtain a game service. Types of interfaces provided with the gaming machine include a jackpot interface for displaying one or more jackpots selected by the player or one or more jackpots that the player is eligible to win.

24 Claims, 17 Drawing Sheets

(56) References Cited

U.S. PATENT DOCUMENTS 5,043,889 A 8/1991 Lucey
5,073,700 A 12/1991 D'Onofrio
5,110,129 A 5/1992 Alvarez
5,116,055 A 5/1992 Tracy
5,212,369 A 5/1993 Karlisch et al.
5,265,874 A 11/1993 Dickinson et al.
5,277,424 A 1/1994 Wilms
5,280,809 A 1/1994 Tive
5,286,023 A 2/1994 Wood
5,395,242 A 3/1995 Slye et al.
5,429,361 A * 7/1995 Raven et al. .................... 463/25
5,452,379 A 9/1995 Poor
5,470,079 A 11/1995 LeStrange et al.
5,475,740 A 12/1995 Biggs, Jr. et al.
5,488,411 A 1/1996 Lewis
5,494,287 A 2/1996 Manz
5,536,016 A 7/1996 Thompson
5,537,314 A 7/1996 Kanter
5,577,731 A 11/1996 Jones
5,586,936 A 12/1996 Bennett et al.
5,605,334 A 2/1997 McCrea, Jr.
5,638,426 A 6/1997 Lewis
5,655,961 A 8/1997 Acres et al.
5,679,007 A 10/1997 Potdevin et al.
5,679,077 A 10/1997 Pocock et al.
5,702,304 A 12/1997 Acres et al.
5,704,835 A 1/1998 Dietz, II
5,707,286 A 1/1998 Carlson
5,759,102 A 6/1998 Pease et al.
5,761,647 A 6/1998 Boushy
5,766,076 A 6/1998 Pease et al.
5,769,716 A 6/1998 Saffari et al.
5,770,533 A 6/1998 Franchi
5,779,545 A 7/1998 Berg et al.
5,779,548 A 7/1998 Asai et al.
5,788,573 A 8/1998 Baerlocher et al.
5,796,389 A 8/1998 Bertram et al.
5,800,268 A 9/1998 Molnick
5,803,809 A 9/1998 Yoseloff
5,809,482 A 9/1998 Strisower
5,811,772 A 9/1998 Lucero
5,816,918 A 10/1998 Kelly et al.
5,820,459 A 10/1998 Acres et al.
5,823,873 A 10/1998 Moody
5,830,067 A 11/1998 Graves et al.
5,833,536 A 11/1998 Davids et al.
5,833,540 A 11/1998 Miodunski et al.
5,851,147 A * 12/1998 Stupak et al. ................... 463/13
5,851,148 A 12/1998 Brune et al.
5,851,149 A 12/1998 Xidos et al.
5,855,515 A 1/1999 Pease et al.
D406,612 S 3/1999 Johnson
5,885,158 A 3/1999 Torango et al.
5,902,983 A 5/1999 Crevelt et al.
5,919,091 A 7/1999 Bell et al.
5,951,011 A 9/1999 Potter et al.
5,951,397 A 9/1999 Dickinson
5,957,776 A 9/1999 Hoehne
5,967,896 A 10/1999 Jorasch et al.
5,971,271 A 10/1999 Wynn et al.
5,983,196 A 11/1999 Wendkos
5,984,779 A 11/1999 Bridgeman et al.
5,990,885 A 11/1999 Gopinath
6,001,016 A 12/1999 Walker et al.
6,003,013 A 12/1999 Boushy
6,003,651 A 12/1999 Waller et al.
6,004,211 A 12/1999 Brenner et al.
6,007,426 A 12/1999 Kelly et al.
6,010,404 A 1/2000 Walker et al.
6,012,983 A 1/2000 Walker et al.
6,015,344 A 1/2000 Kelly et al.
6,032,955 A 3/2000 Luciano et al.
6,048,269 A 4/2000 Burns et al.
6,050,895 A 4/2000 Luciano, Jr. et al.
6,062,981 A 5/2000 Luciano, Jr.
6,068,552 A 5/2000 Walker et al.
6,070,878 A 6/2000 Jones
6,077,163 A 6/2000 Walker et al.
6,089,975 A 7/2000 Dunn
6,099,408 A 8/2000 Schneier et al.
6,110,041 A 8/2000 Walker et al.
6,110,043 A 8/2000 Olsen
6,113,492 A 9/2000 Walker et al.
6,113,493 A 9/2000 Walker et al.
6,113,495 A 9/2000 Walker et al.
6,146,273 A 11/2000 Olsen
6,149,522 A 11/2000 Alcorn et al.
6,152,822 A 11/2000 Herbert
6,162,121 A 12/2000 Morro et al.
6,162,122 A 12/2000 Acres et al.
6,165,072 A 12/2000 Davis et al.
6,183,362 B1 2/2001 Boushy
6,186,404 B1 2/2001 Ehrhart et al.
6,203,010 B1 3/2001 Jorasch et al.
6,203,427 B1 3/2001 Walker et al.
6,210,275 B1 4/2001 Olsen
6,241,608 B1 6/2001 Torango
6,264,560 B1 7/2001 Goldberg et al.
6,264,561 B1 7/2001 Saffari
6,270,409 B1 8/2001 Shuster
6,272,223 B1 8/2001 Carlson
6,287,202 B1 9/2001 Pascal et al.
6,293,866 B1 9/2001 Walker et al.
6,302,790 B1 10/2001 Brossard
6,315,665 B1 11/2001 Faith
6,319,125 B1 11/2001 Acres
6,325,375 B1 12/2001 Potter et al.
6,343,988 B1 2/2002 Walker et al.
6,346,044 B1 2/2002 McCrea, Jr.
6,358,149 B1 3/2002 Schneider et al.
6,394,907 B1 5/2002 Rowe
6,409,602 B1 6/2002 Wiltshire et al.
6,439,993 B1 8/2002 O'Halloran
6,450,885 B2 9/2002 Schneier et al.
6,450,887 B1 9/2002 Mir et al.
6,456,977 B1 9/2002 Wang
6,471,591 B1 10/2002 Crumby
6,478,676 B1 11/2002 Dayan
6,511,377 B1 1/2003 Weiss
6,554,709 B1 4/2003 Brenner et al.
6,572,477 B2 6/2003 Hightower
6,585,592 B1 7/2003 Crumby
6,589,115 B2 7/2003 Walker
6,592,460 B2 7/2003 Torango
6,599,193 B2 7/2003 Baerlocher et al.
6,645,068 B1 11/2003 Kelly et al.
6,645,077 B2 11/2003 Rowe
6,675,152 B1 1/2004 Prasad et al.
6,685,567 B2 2/2004 Cockerille et al.
6,709,333 B1 3/2004 Bradford et al.
6,712,698 B2 3/2004 Paulsen et al.
6,722,985 B2 4/2004 Criss-Puszkiewicz et al.
6,724,385 B2 4/2004 Takatsuka et al.
6,743,098 B2 6/2004 Urie et al.
6,758,757 B2 7/2004 Luciano, Jr. et al.
6,776,715 B2 8/2004 Price
6,804,763 B1 10/2004 Stockdale et al.
6,852,031 B1 2/2005 Rowe
6,863,608 B1 3/2005 LeMay et al.
6,866,586 B2 3/2005 Oberberger et al.
6,884,170 B2 4/2005 Rowe
6,979,266 B2 12/2005 Lemay et al.
7,008,319 B2 3/2006 Montgomery et al.
7,481,430 B1 1/2009 Jackson et al.
2001/0028147 A1 10/2001 Ornstein et al.
2002/0042297 A1 4/2002 Torango
2002/0077712 A1 6/2002 Safaei et al.
2002/0098888 A1 7/2002 Rowe et al.
2002/0103027 A1 8/2002 Rowe et al.
2002/0142815 A1 10/2002 Candelore
2002/0142825 A1 10/2002 Lark et al.
2002/0142846 A1 10/2002 Paulsen
2002/0147047 A1 10/2002 Letovsky et al.
2002/0147640 A1 10/2002 Daniele et al.

(56) References Cited

U.S. PATENT DOCUMENTS

| | | | | |
|---|---|---|---|---|
| 2002/0151366 | A1 | 10/2002 | Walker et al. | |
| 2002/0155874 | A1 | 10/2002 | Byrne | |
| 2002/0193160 | A1 | 12/2002 | Tarantino | |
| 2002/0198052 | A1 | 12/2002 | Soltys et al. | |
| 2003/0027630 | A1 | 2/2003 | Kelly et al. | |
| 2003/0050806 | A1 | 3/2003 | Friesen et al. | |
| 2003/0073497 | A1 | 4/2003 | Nelson | |
| 2003/0083943 | A1 | 5/2003 | Adams et al. | |
| 2003/0100361 | A1 | 5/2003 | Sharpless et al. | |
| 2003/0148808 | A1 | 8/2003 | Price | |
| 2003/0190944 | A1 | 10/2003 | Manfredi | |
| 2003/0203756 | A1 | 10/2003 | Jackson | |
| 2004/0002379 | A1 | 1/2004 | Parrott et al. | |
| 2004/0077395 | A1 * | 4/2004 | Tuhy et al. | 463/13 |
| 2004/0087357 | A1 * | 5/2004 | Johnson | 463/17 |
| 2004/0087370 | A1 | 5/2004 | Tarantino | |
| 2004/0116174 | A1 | 6/2004 | Baerlocher et al. | |
| 2004/0147314 | A1 | 7/2004 | LeMay et al. | |
| 2005/0003883 | A1 | 1/2005 | Muir et al. | |
| 2005/0059472 | A1 * | 3/2005 | Joshi et al. | 463/20 |
| 2005/0090305 | A1 * | 4/2005 | Silva et al. | 463/16 |
| 2005/0143169 | A1 * | 6/2005 | Nguyen et al. | 463/25 |
| 2005/0170890 | A1 | 8/2005 | Rowe et al. | |

FOREIGN PATENT DOCUMENTS

| | | | |
|---|---|---|---|
| DE | 19905076 | | 5/2000 |
| DE | 19944140 | | 3/2001 |
| EP | 0769769 | | 4/1997 |
| EP | 0887753 | | 12/1998 |
| EP | 1039423 | | 9/2000 |
| EP | 1087323 | | 3/2001 |
| EP | 1136930 | | 9/2001 |
| EP | 1396829 | A2 | 3/2004 |
| EP | 1482459 | | 12/2004 |
| GB | 2383880 | A | 7/2003 |
| WO | WO 00/38089 | | 6/2000 |
| WO | WO 00/76239 | | 12/2000 |
| WO | WO 00/79489 | | 12/2000 |
| WO | WO 01/75815 | | 10/2001 |
| WO | WO 01/81093 | | 10/2001 |
| WO | WO 02/01458 | A2 | 1/2002 |
| WO | WO 02/24288 | | 3/2002 |
| WO | WO 02/077935 | | 10/2002 |
| WO | WO 2004/027584 | * | 4/2004 |
| WO | WO 2004/056432 | | 7/2004 |
| WO | WO 2005/028056 | | 3/2005 |

OTHER PUBLICATIONS

Examiner Report dated Aug. 23, 2010 from Australian Patent Application No. 2006216910.
Final Office Action dated Oct. 28, 2010 from U.S. Appl. No. 11/372,549.
Fourth Office Action dated Nov. 16, 2010 from Chinese Patent Application No. 2006800056890.
Examination Report dated Apr. 13, 2010 for Australian Patent Application No. 2005294254.
Office Action dated May 19, 2010 from U.S. Appl. No. 11/372,549.
Office Action dated Nov. 19, 2009 from U.S. Appl. No. 10/958,843.
Second Office Action dated Sep. 11, 2009 from Chinese Patent Application No. 20060800056890.
Final Office Action from U.S. Appl. No. 10/958,843, dated Apr. 27, 2009.
Office Action dated Mar. 31, 2009 from U.S. Appl. No. 11/372,549.
First Office Action dated Mar. 20, 2009 from Chinese Patent Application No. 2006800056890.
Microsoft Windows 95, 1995, Microsoft Corporation, pp. 12& 16.
Office Action, dated Jan. 31, 2008 from U.S. Appl. No. 11/372,549.
Scarne, John, Scarne's New Complete Guide to Gambling, 1974, Simon and Schuster, pp. 39-41.
European Examination Report dated Nov. 14, 2007 from related European Application No. 05 807 613.4.
European Examination Report dated Jan. 16, 2008 from related European Application No. 06 735 371.4.
European Office Action dated Jan. 12, 2007 in related EP Application No. 02773484.7.
International Search Report and Written Opinion dated Jul. 26, 2006 from corresponding PCT Application No. PCT/US2006/005677.
Office Action from U.S. Appl. No. 10/958,843, dated Aug. 17, 2007.
Office Action from U.S. Appl. No. 10/958,843, dated Mar. 25, 2008.
Office Action dated Sep. 18, 2008 from U.S. Appl. No. 11/372,549.
Office Action from U.S. Appl. No. 10/958,843, dated Sep. 15, 2008.
International Search Report and Written Opinion dated Jul. 26, 2006 from Corresponding PCT Application No. PCT/US2006/005677 8 pages.
International Search Report and Written Opinion dated Jun. 14, 2006 from Related PCT Application No. PCT/US2006/005685 8 pages.
International Search Report and Written Opinion dated Jun. 14, 2006 from Related PCT Application No. PCT/US2006/005455 9 pages.
Bally's Brief in Support of Their Proposed Constructions for the '698 and '985 Patents: *IGT* v. *Alliance Gaming Corp.; Bally Gaming International; and Bally Gaming, Inc.* U.S. District Court of Nevada Case No. CV-S-04-1676- RCJ-(RJJ) (38 pages).
Declaration of John F. Acres in Support of Defendant's Opening Claim Construction Brief for the '698 and '985 Patents: *IGT* v. *Alliance Gaming, Corp.; Bally Gaming International, Inc.; and Bally Gaming, Inc.* U.S. District of Nevada Case No. CV-S-04-1676-RCJ-(RJJ) (47 pages).
Declaration of Bart A. Lewin in Support of Plaintiff IGT's Opening Claim Construction Brief Addressing U.S. Pat. No. 6,712,698 and U.S. Pat. No. 6,722,985 (The "Player Tracking Unit" Patents): *IGT* v. *Alliance Gaming Corporation; Bally Gaming International; and Bally Gaming, Inc.* U.S. District of Nevada Case No. CV-S-04-1676-RCJ-(RJJ) (13 pages).
Plaintiff IGT's Opening Claim Construction Brief Addressing U.S. Pat. No. 6,712,698 and U.S. Pat. No. 6,722,985 (The "Player Tracking Unit" Patents) U.S. District Court of Nevada Case No. CV-S-04-1676-RCJ-(RJJ) (34 pages).
Defendant's Invalidity Contentions in Litigation Proceedings: *IGT* vs. *Bally's* District of Nevada Case No. CV-S-04-1676-RCJ-(RJJ) (194 pages).
International Search Report and Written Opinion dated Feb. 27, 2006 from a corresponding PCT Application No. PCT/US2005/036116 (10 pages).
European Office Action dated Dec. 20, 2005 from a related EP Application No. 02773484.7 (3 pages).
Wang Z et al.; "Casino Technology: Player Tracking and Slot Accounting Systems" Gaming Research and Review Journal, UNLV International Gaming Institute, Las Vegas, NV, U.S. vol. 6, No. 1, 2000, pp. 43-56, XP001149561, ISSN: 1531-0930, the whole document (14 pages).
Paul Yao, Microsoft Windows CE 2.0: It's Not Just for Handheld PCs Any More—MSJ, May 1998; www.microsoft.com/msj/0598/wince.as 12x (pp. 1-23).
Mark Fischetti, Touch Screens: At Your Fingertips, Scientific American, Apr. 2001 (pp. 102-103).
Dan Bricklin, About Tablet Computing Old and New, Nov. 22, 2002; http://www.bricklin.com/tabletcomputing.htm (pp. 1-7).

* cited by examiner

JACKPOT INTERFACES AND SERVICES ON A GAMING MACHINE

CROSS-REFERENCE TO RELATED PATENT APPLICATIONS

This Application is a continuation of U.S. patent application Ser. No. 11/064,217 entitled "JACKPOT INTERFACES AND SERVICES ON A GAMING MACHINE," filed on Feb. 22, 2005, which is a continuation-in-part of U.S. patent application Ser. No. 10/958,843 entitled "WIDE AREA PROGRESSIVE JACKPOT SYSTEMS AND METHODS," filed on Oct. 4, 2004, which has granted as U.S. Pat. No. 7,862,427, both of which are incorporated by reference in their entireties and for all purposes.

This application is related to U.S. patent application Ser. No. 09/961,051 entitled "GAME SERVICE INTERFACES FOR PLAYER TRACKING TOUCH SCREEN DISPLAY," filed Sep. 20, 2001, which has granted as U.S. Pat. No. 6,712,698, which is incorporated by reference in its entirety for all purposes.

This application is related U.S. patent application Ser. No. 11/064,168 entitled "DIRECTION INTERFACES AND SERVICES ON A GAMING MACHINE," filed on Feb. 22, 2005, which is incorporated by reference in its entirety and for all purposes.

This application is related U.S. patent application Ser. No. 11/064,207 entitled "HARM MINIMIZATION INTERFACES AND SERVICES ON A GAMING MACHINE," filed on Feb. 22, 2005, which is incorporated by reference in its entirety and for all purposes.

BACKGROUND

This invention relates to game playing methods for gaming machines such as video slot machines and video poker machines. More particularly, the present invention relates to methods and apparatus for providing player tracking services and related gaming services on a gaming machine.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, such as button pads and levers, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server. Player tracking units are usually manufactured as an after-market device separate from the gaming machine. Many different companies manufacture player tracking units as part of player tracking/accounting systems. These player tracking/accounting systems are used in most casinos. Most casinos utilize only one type of player tracking system (i.e. from one manufacturer) while the type of player tracking system varies from casino to casino.

Player tracking cards and player tracking programs are becoming more and more popular. They have become a de facto marketing method of doing business at casinos. The programs allow a casino to identify and reward customers based upon their previous game play history. In particular, a goal of the casinos is to identify and then to provide a higher level of service to certain groups of players identified as especially valuable to the casinos. An incentive of a casino for providing these services is to generate "brand" loyalty, and thus, repeat business from its valued customers. For instance, players that visit the casino, on average, once a week may be deemed as "special" customers and the casino may desire to cultivate a "special" relationship with these customers. In general, the selection of gaming services offered to players via loyalty programs, such as player tracking programs, is increasing. Also, the gaming services offered to a particular player are becoming more focused based upon the desires of a particular player.

In the past, player tracking units have been primarily designed to allow a player to enter a magnetic striped card and possibly enter an identification code using a key pad. Therefore, the player tracking unit interface, which has been designed to perform these tasks, typically includes a key pad, a card reader and a simple display such as an LED. Thus, a disadvantage of current player tracking units is that the player interface is not necessarily suited for providing increasingly complex and diverse gaming services to game players that are customized to an individual player's preferences.

In view of the above, it would be desirable to provide apparatus and methods for a player tracking unit interface that allows a diverse range of gaming services to be offered to a player playing a game on a gaming machine.

SUMMARY

This invention addresses the needs indicated above by providing a player tracking unit with a touch screen display with a touch screen controller integrated into the touch screen sensor assembly. Game service interfaces may be presented on the touch screen display that allows a user to obtain one or more game services. The game service interfaces may include buttons with alpha-numeric symbols, function keys and handwriting recognition capabilities that are recognized using input data from the touch screen sensor. Thus, with the touch screen sensor, a user may navigate through the game service interface and supply gaming information required to obtain a game service. Types of interfaces provided with the gaming machine include a harm minimization interface for helping a player to adhere to one or more game play limits during game play at the gaming machine, a jackpot interface for displaying one or more jackpots selected by the player and a directions interface for directing the player to a location of interest.

One aspect of the present invention provides a gaming machine. The gaming machine may be generally characterized as comprising: 1) a master gaming controller designed or configured to generate and to control a game of chance played on the gaming machine; 2) an input mechanism under control of the master gaming controller for receiving cash or an indicia of credit for making wagers on an outcome of the game of chance; 3) an output mechanism under control of the master gaming controller for outputting the cash or the indicia of credit wherein the indicia of credit is redeemable for cash; 4) a memory for storing software instructions for generating a harm minimization interface wherein the harm minimization interface is for helping a player to adhere to one or more game play limits; and 5) a first display for displaying a game service interface including the harm minimization interface. A touch screen may be coupled to the first display. Further, the game of chance may be selected from the group consisting of video slot games, mechanical slot games, video black jack games, video poker games, video keno games, video pachinko games, video card games, video games of chance, bingo games, lottery games, dice games, keno games and combinations thereof.

In particular embodiments, the one or more game play limits may be selected from the group consisting of a time limit, a wager limit, an amount won, an amount lost, an amount banked, a number of games played, a rate of game play, a number of games where a win has occurred and a number of games where a loss has occurred. The one or more game play limits may be set by the player, a gaming machine operator, a gaming regulatory entity or combinations thereof. In response to one or more of the game play limits being exceeded one or more of the following steps may be taken on the gaming machine: 1) a message may be displayed on the gaming machine where the message is in one of a textual format, a graphical format, an audio format, a video format or combinations thereof, 2) the gaming machine may prevent the player from playing additional games, such as by initiating a cash-out sequence on the gaming machine, 3) a quality of a presentation on the gaming machine may be degraded to discourage additional game play on the gaming machine, 4) a maximum wager amount for the game of chance is decreased, 5) the player may be prevented from making a wager for an amount of time and 6) a rate at which the game of chance is presented may be decreased.

The harm minimization interface may be configured in a variety of ways. For example, one or more meters or video feeds may be displayed on the harm minimization interface. The one or more meters may be selected from the group consisting of an amount wagered, an amount of time played, an amount wagered per time, an average amount wagered per game, an amount won, an amount lost, an amount lost per time, an amount won per time, a ratio of an amount won versus an amount wagered, a number of games played, a number of games where a loss has occurred, a number of games where a win has occurred, an amount won per game, an amount lost per game, an amount banked and a number of drinks consumed.

In a particular embodiment, a harm minimization configuration interface may be provided that allows the harm minimization interface to be customized. A game player may use the harm minimization configuration interface to select one or more of game play limits, types of meters to display on the harm minimization interface, still pictures to display on the harm minimization interface, video feeds to display on the harm minimization interface, messages to display on the harm minimization interface, responses to game play limits being exceeded, a display format for the harm minimization interface or combinations thereof.

In yet another embodiment, the gaming machine may further comprises a microphone for receiving a voice statement of one of the game play limits from the player. The voice statement may be stored on the gaming machine or a remote device. The gaming machine may also comprise a playback code for locating a stored record of the voice statement and playing it back on the gaming machine. Further, the gaming machine may comprise a hand writing interface for capturing a signature or mark input into the gaming machine in an electronic format. The signature or mark may be used for confirming a choice of game play limits made by the game player.

In particular embodiments, the software instructions for generating the harm minimization interface may be executed by the master gaming controller and the first display is operable to display the game of chance. In addition, the gaming machine may further comprise a second display operable for displaying the game of chance. The gaming machine may also comprise a player tracking unit coupled to the gaming machine, where the player tracking unit comprising a logic device separate from the master gaming controller, a network interface for communicating with a player tracking server and a communication interface for communicating with the master gaming controller. The software instructions for generating the harm minimization interface may be executed by the logic device. Also, the player tracking server may be designed or configured i) to compare one or more game play limits to game play data received from the gaming machine and to notify the gaming machine when the one or more game play limits have been exceeded. The first display may be controlled by the logic device.

In yet another embodiment, the gaming machine may include a device interface for communicating with a hand-held computing device comprising a hand-held display, a logic device separate from the master gaming controller and one or more input mechanisms coupled to the hand-held device. The device interface may be a wired or wireless interface. The hand-held computing device may be adapted for one or more of controlling or providing input to the game service interface generated on the first display. The logic device may execute software instructions for generating and displaying the harm minimization interface on the hand-held display or the first display. Further, the game service interface may be displayed on the hand-held display. The gaming machine may comprise an output port on an outside surface of the gaming machine for providing one of a communication interface, a power interface or combinations thereof to a portable device, such as the hand-held device.

Another aspect of the present invention provides a gaming machine. The gaming machine may be generally characterized as comprising: 1) a master gaming controller designed or configured to generate and to control a game of chance played on the gaming machine; 2) an input mechanism under control of the master gaming controller for receiving cash or an indicia of credit for making wagers on an outcome of the game of chance; 3) an output mechanism under control of the master gaming controller for outputting the cash or the indicia of credit wherein the indicia of credit is redeemable for cash; 4) a memory for storing software instructions for generating a jackpot interface wherein the jackpot interface is for displaying one or more jackpots selected by the player; and 5) a first display for displaying a game service interface including the jackpot interface. A touch screen may be coupled to the first display. Further, the game of chance may be selected from the group consisting of video slot games, mechanical slot games, video black jack games, video poker games, video keno games, video pachinko games, video card games, video games of chance, bingo games, lottery games, dice games, keno games and combinations thereof.

In particular embodiments, the one or more jackpots may be selected from a group of progressive jackpots. The one or more jackpots may be a personal jackpot associated with a particular player and only awarded to the particular player. The personal jackpot may be funded based upon the particular player's spending during gaming activities, non-gaming activities and combinations thereof. Further, a probability of winning the personal jackpot may be varied according to an amount of the personal jackpot or a time since the personal jackpot has last been won. The personal jackpot may be awarded as a result of an event that occurs during a gaming related activity or as a result of an event that occurs during a non-gaming related activity.

The personal jackpot may be awarded on a cashless instrument where an award amount stored on the cashless instrument is redeemable for cash or for additional game play at different gaming machine or table games. Further, the personal jackpot may be awarded on a cashless instrument where an award amount stored on the cashless instrument is redeemable for additional game play and is not redeemable for cash. In addition, the personal jackpot may be awarded on a cashless instrument where an award stored on the cashless instrument is an amount of scrip. The scrip may be redeemable for services and may not redeemable for cash.

The one or more jackpots may be a group jackpot where the group jackpot is funded from activities of members registered in the group. The registered members in a group may only be eligible for awards from the group jackpot. A family, a group of friends, attendees of a convention and a tour group are examples of groups that may be registered for a group jackpot.

In particular embodiments, an award of the one or more jackpots is stored on a cashless instrument where the cashless instrument has an expiration time. The software instructions for generating the jackpot interface may executed by the master gaming controller. The first display is may be used for displaying the game of chance or a second display may be used for displaying the game of chance.

In yet another embodiment, a player tracking unit may be coupled to the gaming machine where the player tracking unit comprises a logic device separate from the master gaming controller, a network interface for communicating with a player tracking server and a communication interface for communicating with the master gaming controller. The software instructions for generating the jackpot interface may be executed by the logic device. Further, the first display may be under control of the logic device.

The gaming machine may also comprise a device interface for communicating with a hand-held computing device. The hand-held device may comprise a hand-held display, a logic device separate from the master gaming controller and one or more hand-held input mechanisms. The hand-held computing device may be adapted for one or more of controlling or providing input to the game service interface generated on the first display. Further, the logic device may execute software instructions for generating and displaying the jackpot interface or a game service interface on the hand-held display or the first display. The gaming machine may comprise an output port on an outside surface of the gaming machine for providing one of a communication interface, a power interface or combinations thereof to a portable device, such as the hand-held device.

Another aspect of the present invention provides a gaming machine. The gaming machine may be generally characterized as comprising: 1) a master gaming controller designed or configured to generate and to control a game of chance played on the gaming machine; 2) an input mechanism under control of the master gaming controller for receiving cash or an indicia of credit for making wagers on an outcome of the game of chance; 3) an output mechanism under control of the master gaming controller for outputting the cash or the indicia of credit wherein the indicia of credit is redeemable for cash; 4) a memory for storing software instructions for generating a directions interface wherein the directions interface is for directing a player to a location within a casino complex wherein at the location one or more activities or services of interest to the player are available; and 5) a first display for displaying a game service interface including the directions interface. A touch screen may be coupled to the first display. Further, the game of chance may be selected from the group consisting of video slot games, mechanical slot games, video black jack games, video poker games, video keno games, video pachinko games, video card games, video games of chance, bingo games, lottery games, dice games, keno games and combinations thereof.

The directions interface may be adapted to receive a search criteria that describes one or more features of the location and to provide directions to one or more locations that satisfy the search criteria. The one or more services or activities that may be found at the location may be selected from the group consisting of a gaming activity, a food service, an entertainment service, a hotel service, a concierge service and a shopping activity. When multiple locations satisfy the search criterion, the interface is operable to display the locations that are closest to the player's current location. The directions interface may be adapted to display status information for the activity or the service at the location. The status information may be used to indicate an availability of the activity or the service.

In other embodiments, the gaming machine may comprise a printer for printing the directions on a media. The media may include a coupon or a promotion for use with the activity or the service at the location. Further the gaming machine may further comprise an output interface for downloading the directions to a portable device carried by the player. The portable device may be a cell phone or a hand-held computing device. The directions may be provided as a map, textual information or audio information. The directions interface may be adapted to display a list of the one or more services or activities. The list may be grouped according to one or more categories or themes.

In yet another embodiment, a player tracking unit may be coupled to the gaming machine where the player tracking unit comprises a logic device separate from the master gaming controller, a network interface for communicating with a player tracking server and a communication interface for communicating with the master gaming controller. The software instructions for generating the directions interface may be executed by the logic device. Further, the first display may be under control of the logic device.

The gaming machine may also comprise a device interface for communicating with a hand-held computing device. The device interface may be a wired or wireless interface. The hand-held device may comprise a hand-held display, a logic device separate from the master gaming controller and one or more hand-held input mechanisms. The hand-held computing device may be adapted for one or more of controlling or providing input to the game service interface generated on the first display. Further, the logic device may execute software instructions for generating and displaying the directions interface or a game service interface on the hand-held display or the first display. The gaming machine may comprise an output port on an outside surface of the gaming machine for providing one of a communication interface, a power interface or combinations thereof to a portable device, such as the hand-held device.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media such as smart card, compact flash memory card, memory stick, RAM, CD-ROM, CD-DVD, hard drive, etc.

These and other features and advantages of the invention will be spelled out in more detail below with reference to the associated drawings.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Figure 1:
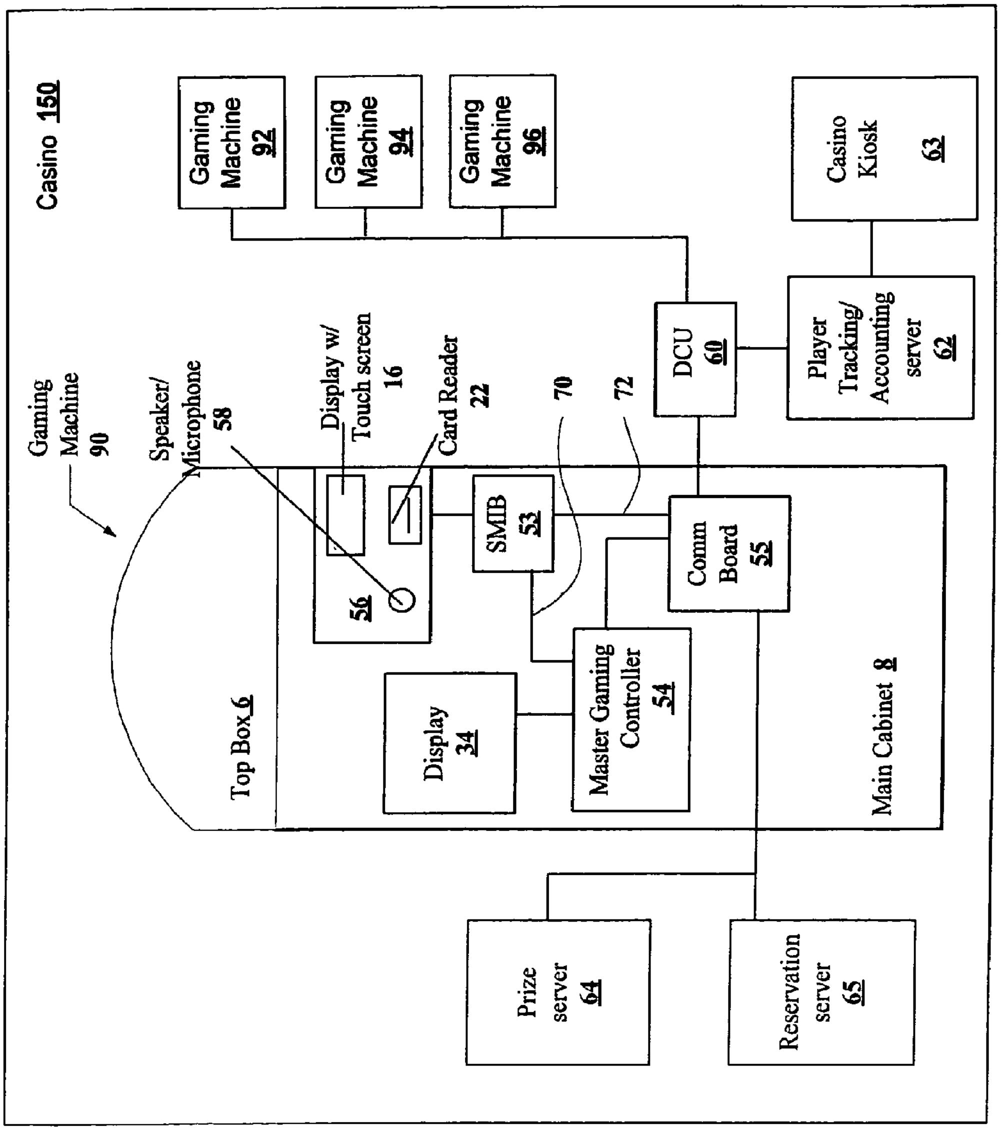
FIG. 1 is a block diagram of a number of gaming machines with player tracking units connected to servers providing gaming services and player tracking services.

In the present invention as shown in FIG. 1, a touch screen display 16 may be used as an interface to provide player tracking services and to provide other game services to a player playing a game on a gaming machine. By way of example, the touch screen display 16 may be used as an interface by a player to: 1) input player tracking identification information, 2) view account information and perform account transactions for accounts such as player tracking accounts and bank accounts, 3) receive operating instructions related to the player tracking unit and the gaming machine, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms on the player tracking unit and the gaming machine, 9) play games and bonus games, 10) request gaming services such as a drink orders, 11) communicate with other players or casino service personnel and 12) register a player for a loyalty program such as a player tracking program. In addition, the touch screen display 16 may be used as an interface by casino service personnel. For example, casino service personnel may use the interface to: a) access diagnostic menus, b) display player tracking unit status information and gaming machine status information, c) access gaming machine metering information, d) display player status information and e) perform other appropriate tasks.

In the present invention, to provide the game services described above, game service interfaces are used that may be implemented with the touch screen display 16. Concepts important to many embodiments of this invention include "loyalty points," "loyalty programs," "loyalty point sessions," and "loyalty program instruments." For instance, many of the described game service interfaces are utilized to provide game services associated with a loyalty program.

Loyalty points refers to any type of points accrued for participating in designated activities at a gaming establishment. Establishments where loyalty points may be accrued include casinos, hotels where gaming activities are provided, stores where gaming activities are permitted, Internet-based gaming activities, and the like. Designated activities include, but are not limited to, gaming activities such as playing gaming machines, card games such as black jack, pai gow poker, baccarat and poker, betting on public event outcomes, table games such as roulette, craps, keno and lotteries, etc. Other patronage activities at gaming establishments may accrue loyalty points. As indicated above, loyalty points represent a form of credit accrued for patronage. The points can be redeemed for a variety of goods or services (or translated to other forms of credit) within a gaming establishment or affiliated establishment. Player tracking points are a typical example of "loyalty points."

The administration and tracking of loyalty points is usually provided in a loyalty program. As described above, the primary goal of a loyalty program is to generate "brand" loyalty for a particular casino or group of casinos. A player tracking program or a slot club are examples of loyalty programs. A participant in a loyalty program may be awarded with "comps" such as free drinks, free meals, free entertainment and other game services according to their level of participation in the loyalty program.

To participate in a loyalty program, a participant is generally required to join the program. In one embodiment of the present invention, a method is described that allows a player to join a loyalty program at a gaming machine. After joining, the participant is usually presented with a loyalty program instrument. The loyalty program instrument typically contains information that allows a member to accrue loyalty points during designated program activities. For example, for most slot clubs, a player is required to insert a magnetic striped card (i.e. a player tracking card) into the gaming machine before player tracking point points are accrued for the player. Examples of loyalty program instruments include a magnetic striped card, a smart card and a portable wireless device. However, in general, a loyalty program instrument may be any device that carries the information necessary for a player to participate in a loyalty program. For instance, a printed ticket with a bar code, plastic card with a bar code or a room key encoding player tracking information may be used as loyalty program instrument. The bar-coded ticket may be read when inserted into a bill validator on the gaming machine to obtain the necessary player tracking information or from a bar-code scanner located on the gaming machine.

Loyalty point sessions are sessions during which a person is performing the designated activity and during which loyalty points accrue. Loyalty point sessions may be delineated by a first event and a second event. The events are usually dependent on the type of loyalty point instrument employed and the designated loyalty program activity. For instance, in a loyalty program session on a gaming machine where a magnetic-striped player tracking card is used for the loyalty program instrument, the insertion of the card into a card reader on the gaming machine and the removal of the card from the card reader may delineate the beginning and end of the loyalty program session. As another example, in a loyalty program session on a gaming machine where a bar-coded ticket is used for the loyalty program instrument, the insertion of the ticket into a bill-validator and a "cash-out" on the gaming machine may delineate the beginning and end of the loyalty program session.

Figure 5:
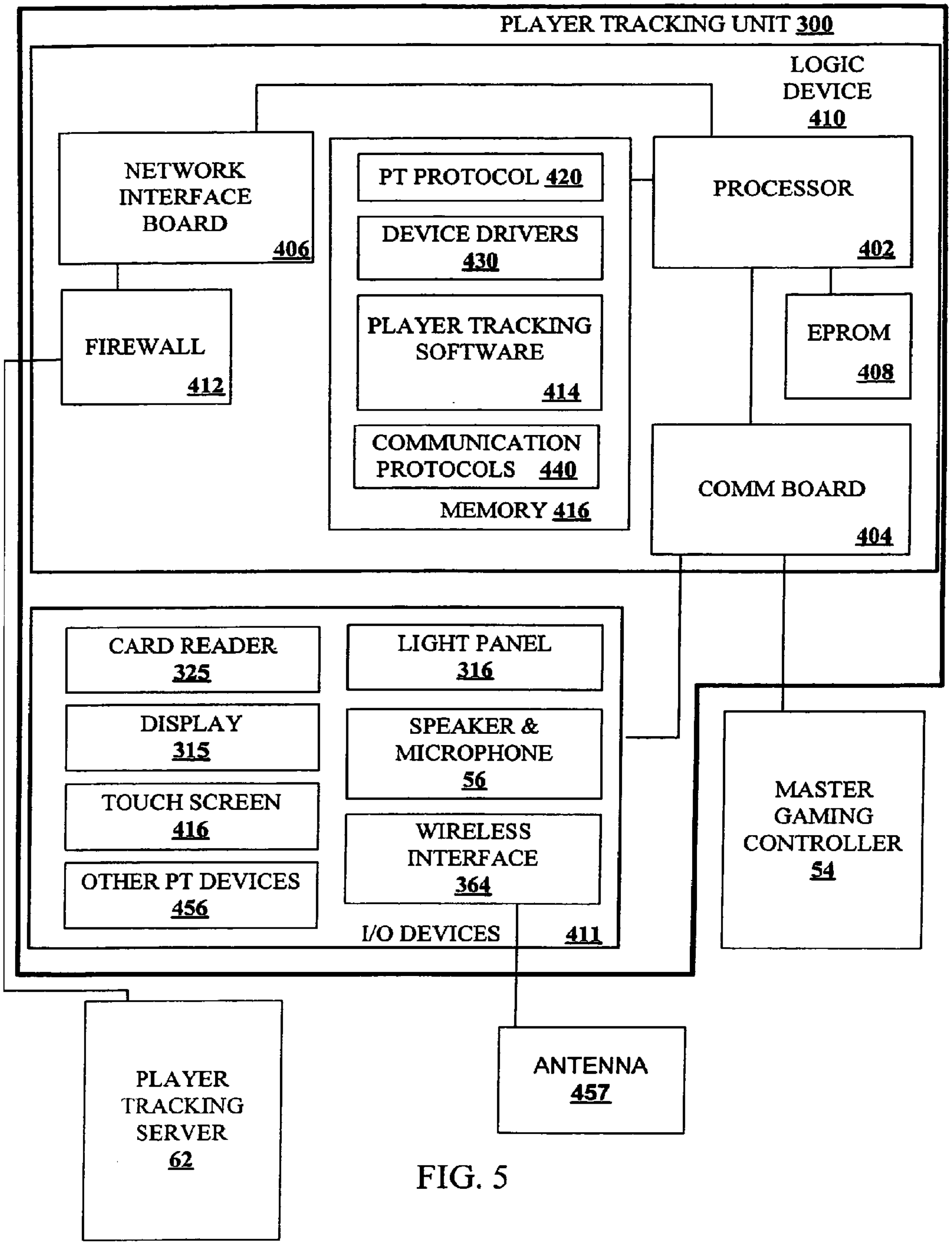
FIG. 5 is a block diagram of the components of a player tracking unit in accordance with one embodiment of the present invention.
Figure 6:
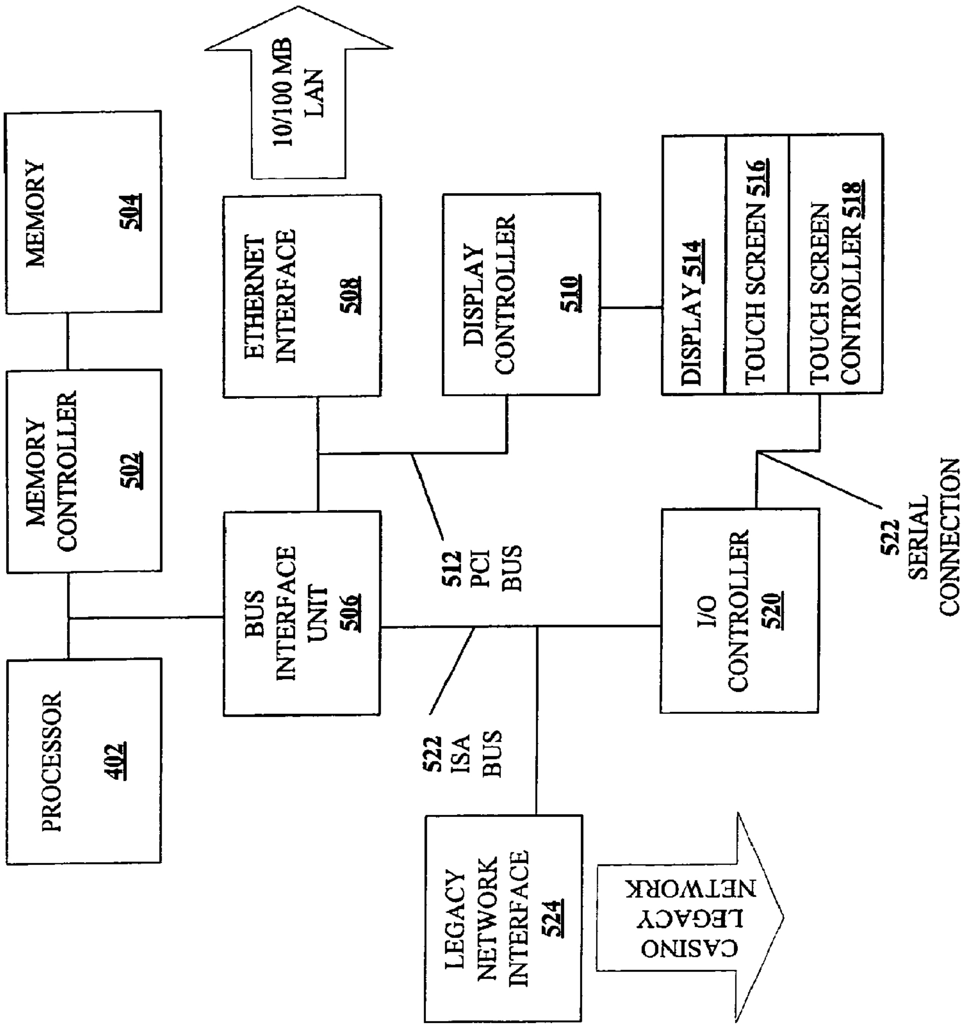
FIG. 6 is a block diagram of processor board with a touch screen display in a player tracking unit for one embodiment of the present invention.
Figure 7:
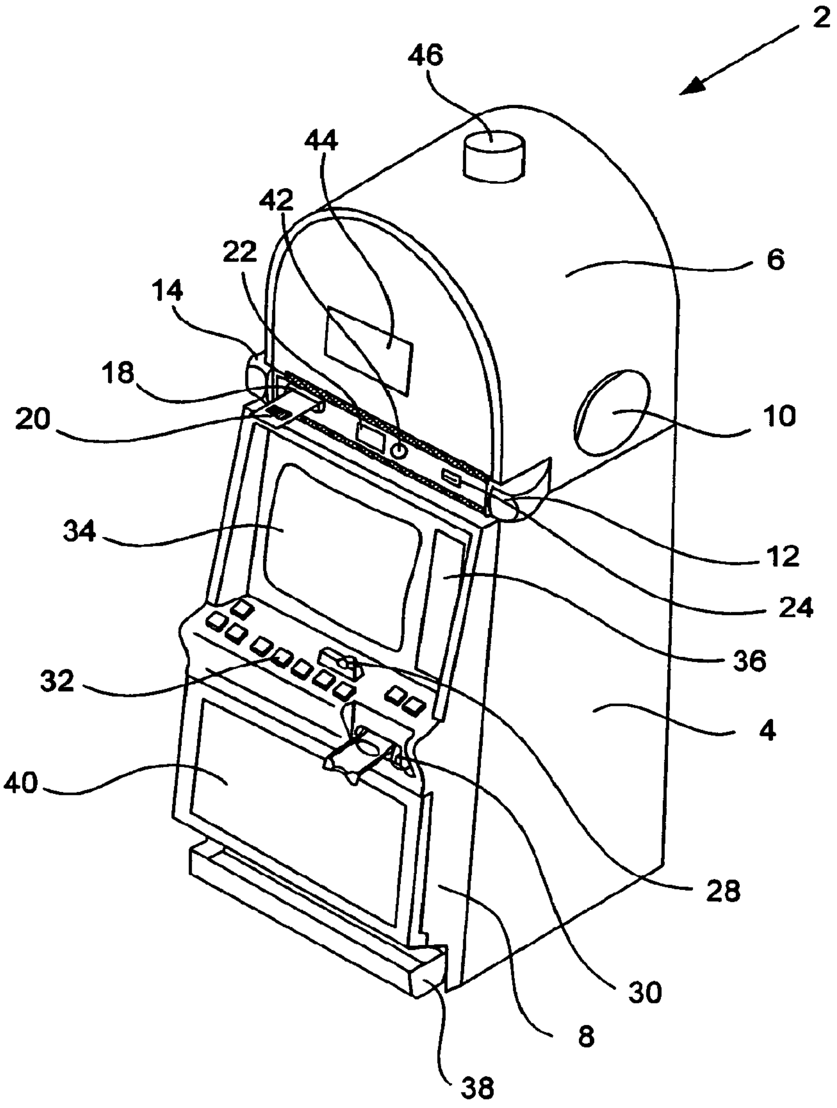
FIG. 7 is a perspective drawing of a video gaming machine that incorporates an embodiment of the present invention.
Figure 9:
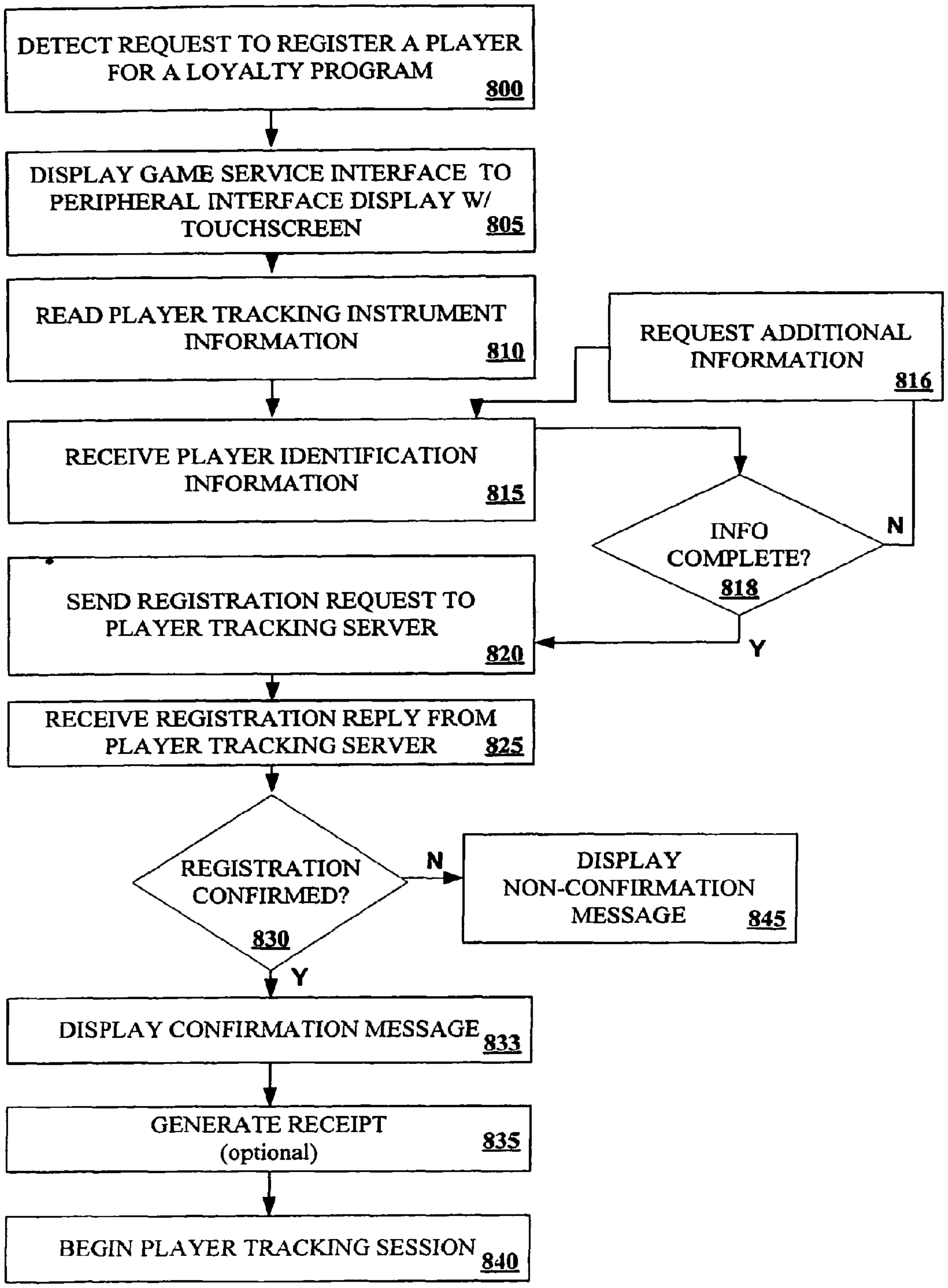
FIG. 9 is a flow chart of a method for providing a "point of play" loyalty program registration on a gaming machine of the present invention.
Figure 10:
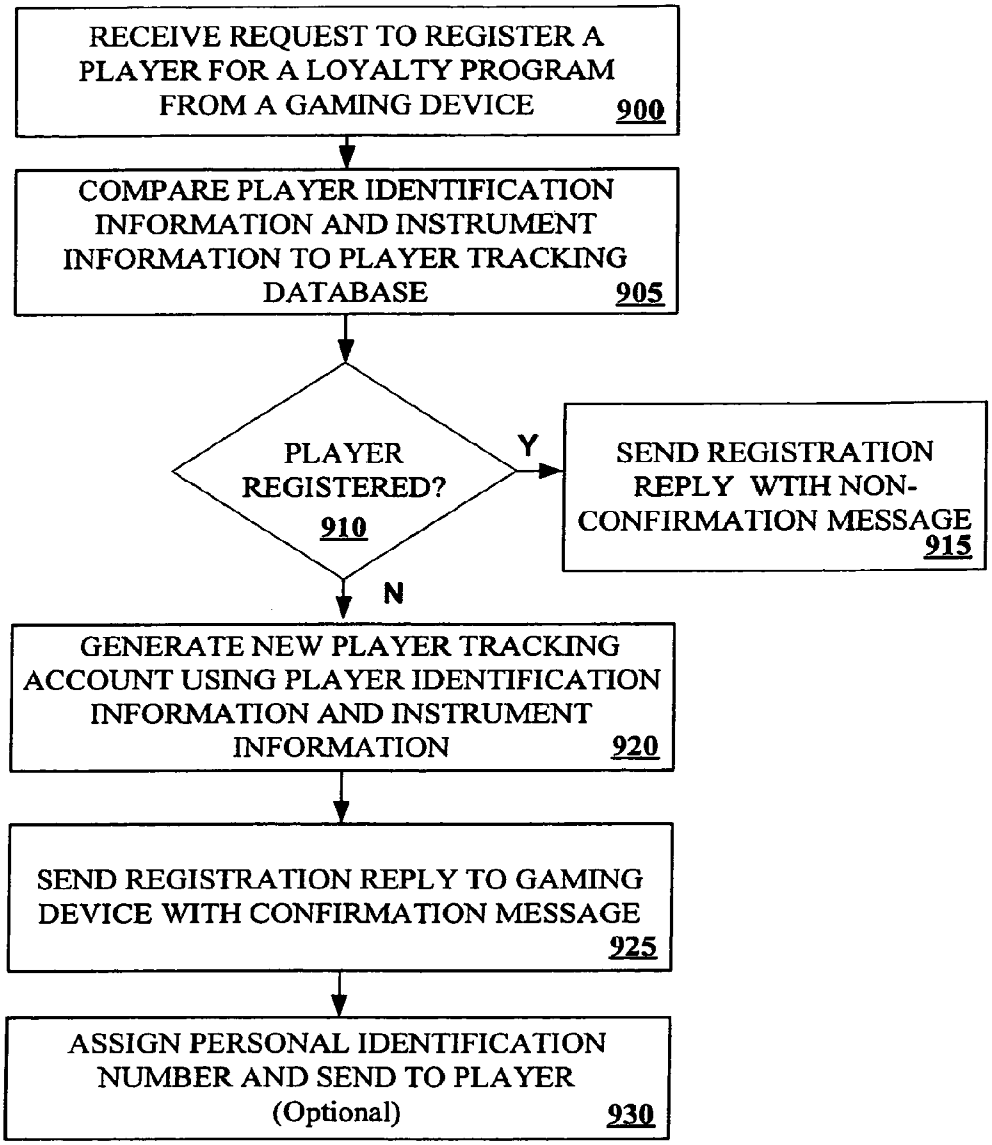
FIG. 10 is a flow chart of a method for providing a "point of play" loyalty program registration on a player tracking server of the present invention.

In FIG. 1, an embodiment of a player tracking system, which may be used as part of loyalty program, is described. In FIGS. 2A-2D, 3A-3E and 4A and 4B, display and touch screen devices (FIGS. 2A-2D), examples of game service interfaces that may be implemented with touch screen devices (FIGS. 3A-3D) and player tracking units incorporating the display and touch screen devices (4A-4D) for a few embodiments of the present invention are described. In FIGS. 5 and 6 block diagrams of player tracking units incorporating the display and touch screen devices for embodiments of the present invention are described. In FIG. 7, the operation of a gaming machine for embodiments of the present invention is described. Finally, in FIG. 8, a method of using game service interfaces on the gaming machine is described. In FIG. 9, a method of registering a player for a loyalty program at a gaming machine is described. In FIG. 10, a method, implemented on a player tracking server, of registering a player for loyalty program is described.

Returning to FIG. 1, an example of a player tracking system using an embodiment of the present invention is described. However, the example is presented for illustrated purposes only as the present invention is not limited to the following example. FIG. 1 is a block diagram of a number of gaming machines with player tracking units connected to servers providing player tracking services and servers providing other gaming services. In casino 150, gaming machines 90, 92, 94 and 96 are connected, via the data collection unit (DCU) 60 to the player tracking/accounting server 62. The DCU 60, which may be connected to up to 32 player tracking units as part of a local network in a particular example, consolidates the information gathered from player tracking units in gaming machines 90, 92, 94 and 96 and forwards the information to the player tracking account server 62. The player tracking account server is designed 1) to store player tracking account information, such as information regarding a player's previous game play, and 2) to calculate player tracking points based on a player's game play. The player tracking points may be used as basis for providing rewards to the player.

In gaming machine 92 of casino 150, a player tracking unit 56 and slot machine interface board (SMIB) 53 are mounted within a main cabinet 8 of the gaming machine. A top box 130 is mounted on top of the main cabinet 8 of the gaming machine. In many types of gaming machines, the player tracking unit is mounted within the top box 6. The player tracking unit 56 may also be mounted on the side of a gaming machine such as on the side of main cabinet 8. Usually, player tracking units, such as 56, and SMIBs, such as 53, are manufactured as separate units before installation into a gaming machine, such as 92.

The player tracking unit 56 includes three peripheral devices, a card reader 24, a speaker and microphone 58, and the touch screen display 16, all mounted within the unit. In some embodiments of the present invention, the peripheral devices within the player tracking unit are controlled by a processor (see FIG. 5) located within the player tracking unit. In other embodiments, one or more peripheral devices may be directly controlled by the master gaming controller 54. In yet other embodiments, the processor in the player tracking unit 56 may be used as a slave controller by the master gaming controller 54 to operate one or more peripheral devices in the player tracking unit 56. Details of player tracking units with peripheral devices operated by a master gaming controller are described in co-pending U.S. patent application Ser. No. 09/838,033, filed Apr. 19, 2001, by Criss-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes.

The player tracking devices are used to input player tracking information that is needed to implement the player tracking program. The player tracking devices may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may be mounted flush with a horizontal surface in a table top gaming machine. The player tracking devices may also be externally mounted to the gaming machine cabinet.

In one embodiment, the player tracking unit 56 may communicate with the player tracking server 60 via the SMIB 53, a main communication board 55 and the data collection unit 60. The SMIB 53 allows the player tracking unit 56 to gather metering information from the gaming machine 92 such as an amount a player has wagered during a game play session. This information may be used by the player tracking server to calculate player tracking points for the player. In another embodiment, the master gaming controller 54 may communicate with the player tracking and accounting server via the communication board 55 and the DCU 60 to send metering information to the server 62.

The player tracking unit 56 is usually connected to the master gaming controller 54 via a serial connection using a wire serial connector and communicates with the master gaming controller 54 using a serial communication protocol. The serial connection between the SMIB 53 and the master gaming controller 54 may be through the main communication board 55 (e.g. through connections 72), through another intermediate device or through a direct connection 70 to the master gaming controller 54. As an example of a serial communication protocol, the master gaming controller 54 may employ a subset of the proprietary Slot Accounting System (SAS protocol) developed by International Game Technology of Reno, Nev. to communicate with the player tracking unit 56.

In some embodiments, proprietary serial connector hardware and proprietary communication protocols may be used for communication between gaming devices within the gaming machine. For instance, Netplex, a proprietary serial communication protocol developed by International Game Technology (IGT, Reno, Nev.), may be used for communication between the peripheral devices, including the speaker/microphone 56, the display w/touch screen 16 and the card reader 24, and a processor on the player tracking unit 56 or communication between the master gaming controller 54 and the peripheral devices. In other embodiments, serial communication between the peripheral devices and a processor on the player tracking unit 56 or the master gaming controller 54 may be provided using non-proprietary industry standard connection hardware and standard communication protocols such as USB, IEEE 1394, Firewire, RS-232, PS/2, IrDA and the like.

In other embodiments of the present invention, serial communication between various gaming devices may be provided using wireless communication hardware and protocols or combinations of wire and wireless communication hardware and communication protocols. For example, the player tracking unit 56 may communicate with the master gaming controller 54 and a local area network connected to the player tracking and accounting server 62 using a wireless communication protocol such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF. Thus, a player tracking unit, such as 56, may be installed in gaming machines 90, 92, 94 and 96 without having to wire it to the gaming machine. In other embodiments, the master gaming controller 54 may communicate with a slave processor on the player tracking unit 56 or directly with peripheral devices such as the display with touch screen 16, the card reader 24 and the speaker/microphone 58 using a wireless communication system compatible with wireless communication standards as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF. In yet another embodiment, the peripheral devices, such as the touch screen display 16, may communicate with a processor on the player tracking unit 56 via a wire communication system such as USB but may also communicate with the master gaming controller 54 via a wireless communication protocol such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 56 may detect this event and receive certain identification information contained on the card. For example, a player's name, address, and player tracking account number encoded on the magnetic striped card, may be received by the player tracking unit 56. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program. In FIGS. 3E, 9 and 10, a method of allowing a new player without a player tracking card to register for a player tracking program, using a "blank" magnetic striped card or other loyalty program instrument at a gaming machine is described.

After a player has inserted her or his player tracking card into the card reader 24, the player tracking unit 56 may command the touch screen display 16 to display the game player's name on the touch screen display 16 and also, may optionally display a message requesting the game player to validate their identity by entering an identification code using a game service interface with an alpha-numeric key pad displayed on touch screen display 16. The player may use their finger, a stylus or combinations thereof to enter their identification information using the touch screen sensor. Once the game player's identity has been validated, the player tracking information is relayed to the player tracking server 62. Typically, the player tracking server 62 stores player tracking account records including the number of player tracking points previously accumulated by the player.

During game play on the gaming machine, the player tracking unit 56 may poll the master gaming controller 54 for game play information such as how much money the player has wagered on each game, the time when each game was initiated and the location of the gaming machine. The game play information is sent by the player tracking unit 56 to the player tracking server 62. While a player tracking card is inserted in the card reader 24, the player tracking server 62 may use the game play information provided by the player tracking unit 56 to generate player tracking points and add the points to a player tracking account identified by the player tracking card. The player tracking points generated by the player tracking server 62 are stored in a memory of some type on the player tracking server.

To provide additional services to a game player the player tracking unit 56 and/or the master gaming controller may communicate with other remote servers, such as the prize server 64, a reservation server 65, a bonus server (not shown). The servers may reside on a local area network or may reside on remote networks that are accessible to the gaming machine 90 via the Internet. Information from these remote servers may be used to provide gaming services to a player playing a game on the gaming machine 90 using the touch screen display 16 as a peripheral interface device. For example, a prize server, such as 64, may be used to redeem a prize won by the player on the gaming machine, i.e. to have the prize shipped to the player's address. As another example, the reservation server 65 may be used by the player to make a dinner or entertainment reservation using the touch screen display 16. An embodiment of a game service interface for making an entertainment reservation that may be used with the touch screen display 16 is described in more detail with respect to FIG. 3C. An embodiment of a game service interface for redeeming a prize that may be used with the touch screen display is described with respect to FIG. 3D. Additional details of providing prizes and prize redemption on a gaming machine are described in co-pending U.S. patent application Ser. No. 09/515,717, filed Feb. 29, 2000 and entitled "Name Your Prize Game Playing Methodology," which is incorporated herein in its entirety and for all purposes.

Figure 2A:
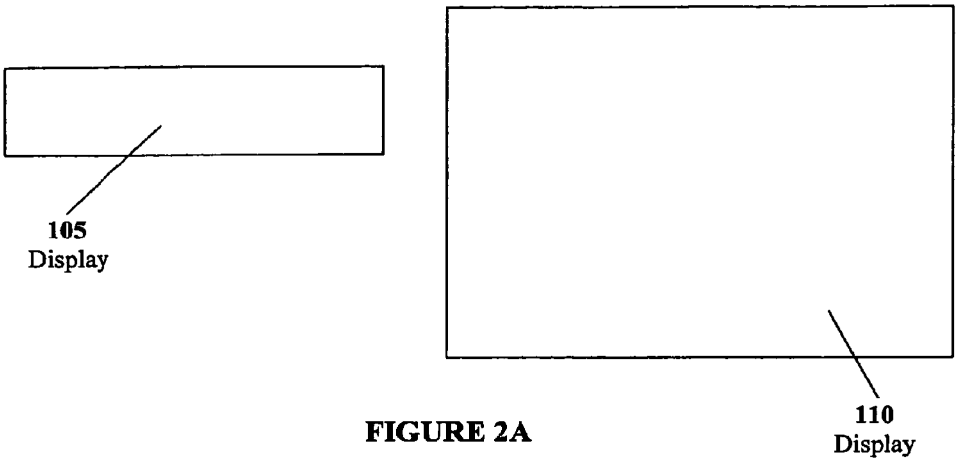
FIGS. 2A-2D are block diagrams of touch screens and displays for some embodiments of the present invention.

FIGS. 2A-2D are block diagrams of touch screens and displays for some embodiments of the present invention. In FIG. 2A, two display screens are shown, a narrow display screen 105 and a display screen 110 with a length to height ratio of about 4 to 3. Traditionally, display screens on player tracking units have used LED's to display a single row of alphanumeric text such as a 16 character display resulting in a narrow display such as 105. A touch screen may be used with an LED display screen to eliminate a key pad on the player tracking unit. However, a color LCD display screen may be preferred over an LED screen to allow for the display of symbols as well as alphanumeric characters. In one embodiment of the present invention, a color LCD display screen with a 3.5 inch diagonal and a resolution of 320 pixels by 240 may be used with a touch screen as a touch screen display. In addition to LCD's and LED's, a touch screen may be used with a plasma display screen, a CRT display as well as with other conventional display technology.

Figure 2B:
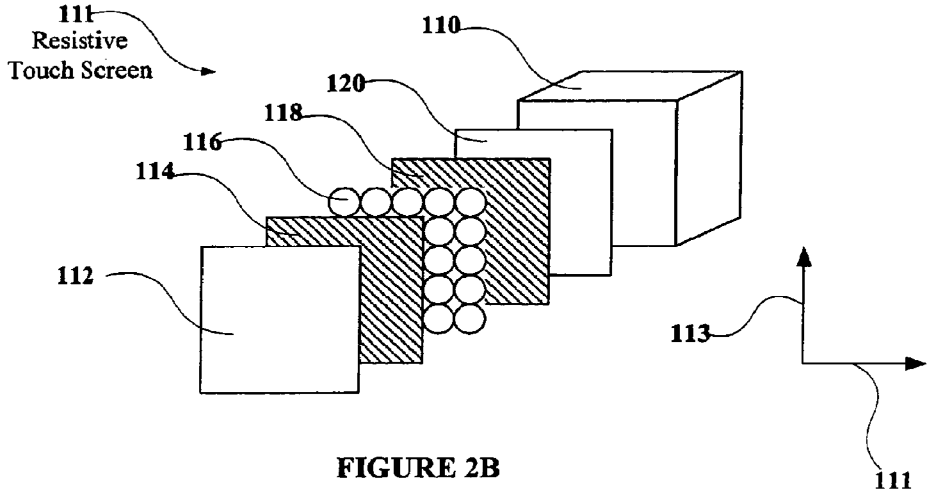
Figure 2C:
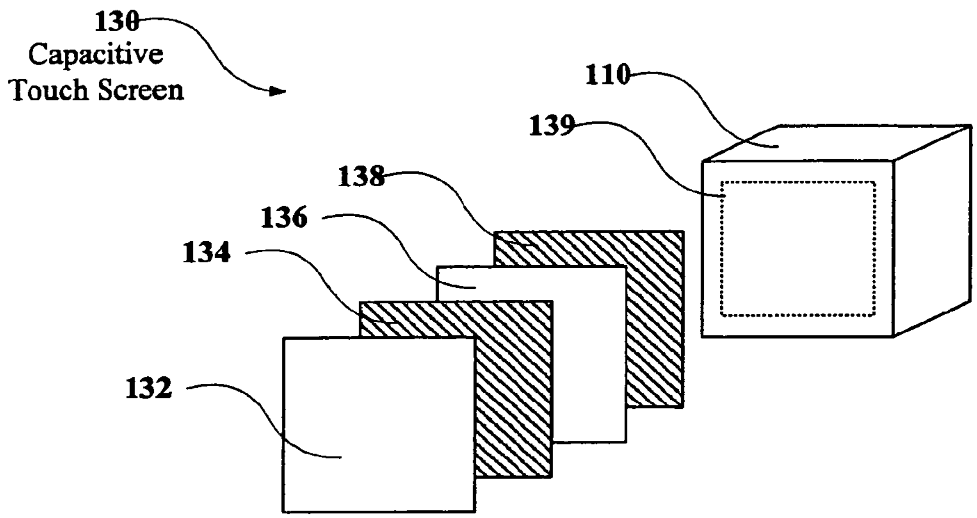
Figure 2D:
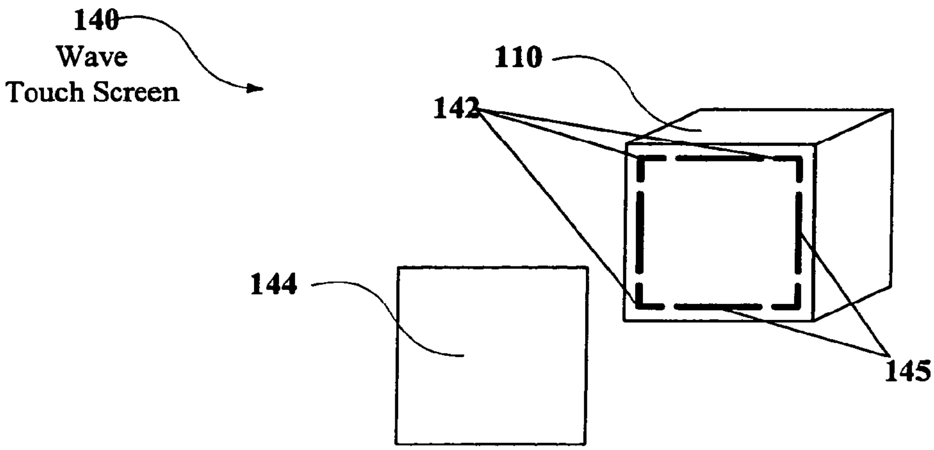

In FIGS. 2B-2D, three embodiments of different types of touch screens, a resistive based touch screen (FIG. 2B), a capacitive based touch screen (FIG. 2C) and a surface acoustic wave touch screen (FIG. 2D) are described. In FIG. 2B, an embodiment of a resistive touch screen 111 integrated with a display 110 is shown. In a resistive touch screen 111, a glass panel 120 is coated with a clear conductive material 118. Polyester spacer dots 116 are used to separate a polyester cover sheet 112 from the glass panel 120 with the conductive material coating 118. An inner surface of the polyester cover sheet 120 in contact with the polyester spacer dots 116 is coated with a conductive metal coating 114. An outer surface of the polyester cover sheet may be covered with a scratch resistant coating (not shown). The glass panel 120 and other layers may be integrated into a touch screen assembly that may be mounted over the display 110 using an adhesive epoxy or some other mounting means.

A touch screen controller (not shown) is used to apply a small voltage gradient across the x-axis 111 of the glass panel 120 and across y-axis 113 of the cover sheet 112 which produces a small current in the panel and the cover sheet. With a voltage applied to the glass panel 120 and cover sheet 112, the layers of the resistive touch screen may be used as a sensor. When a stylus or other implement is used to press the conductive layers, 114 and 118, together, the current flowing across the panel 120 and the cover sheet is altered. Based on the change in current, the touch screen controller determines the x and y coordinates of the stylus contact.

In FIG. 2C, an embodiment of a capacitive touch screen 130 integrated with a display 110 is shown. In a capacitive touch screen 130, a glass panel 136 is coated on both sides with a clear conductive material, 134 and 138. The inner conductive layer 138 may be primarily used for shielding. The outer surface of the touch screen may be a scratch resistant coating 132. Electrodes 139 are uniformly distributed around the edge of the touch screen 130 to apply a low-voltage field uniformly across the outer conductive layer 134. When a finger or a conductive stylus contacts the screen 132, a capacitive coupling occurs with voltage field which causes a small current to be drawn into the finger or the stylus. The current flow from the corners of the touch screen electrodes 139 are measured. The measured current flow is used by the touch screen controller (not shown) to determine the location of the contact on the screen.

In FIG. 2D, an embodiment of a wave touch screen mounted to a display 110 is shown. The screen 144 is an uncoated glass panel. In one type of wave touch screen, transducers 142 in the corners produce ultrasonic waves on the glass panel. The reflectors 145 are used to create a standing wave pattern on the glass panel 144. When a soft-tipped stylus is touched to the surface of the panel 144, the transducers detect the attenuation of the wave, which may be used by a touch screen controller to determine the coordinates of the stylus. In an infrared touch screen, LED's and photoresistors on the edge of the screen are used to create a grid of infrared beams. A stylus or finger may be used to obstruct the beams and the touch screen controller determines the coordinates of the obstruction.

For most embodiments of the present invention, a capacitive based touch screen is preferred but the present invention is not limited to capacitive based touch screens. Capacitive touch screens are very clear, durable and have a high resolution. However, capacitive touch screen are generally more expensive than resistive touch screens. Further, when a finger is used as a stylus on a capacitive touch screen, a small amount of current is drawn into to the finger which some game players may find annoying. Thus, in some embodiments, other touch screen types, such as a resistive touch screen or a wave touch screen, may be employed with the present invention.

The touch screen controller processes signals from the touch screen sensor and passes touch screen event data to one or more gaming devices that utilize the touch screen event data. For instance, the x and y coordinates of a contact point on the touch screen may be used be a processor on a player tracking unit, a master gaming controller or combinations thereof, to allow a user to navigate through a game service interface (see FIGS. 3A-3D) and to enter gaming information. In general, a logic device in communication with the touch screen, such as the processor on the player tracking unit or the master gaming controller, uses a device driver to receive touch screen event data from the touch screen controller. The touch screen controller may be a component separate from the touch screen assembly. The touch screen assembly includes the layers of the touch screen sensor and is mounted onto a display. In one embodiment of the present invention, the touch screen controller is integrated into the touch screen assembly.

FIGS. 3A-3H are block diagram of game service interfaces for some embodiments of the present invention. In each of the figures, a single "page" of the game service interface that may be displayed on a touch screen display of the present invention is shown. However, the game service interfaces are not limited to a single page. Multiple pages may be used with each game service interface to provide a particular game service. Thus, in some embodiments, to utilize a game service interface to receive a game service, a user may be required to navigate through multiple pages.

A component layout for each game service interface is provided for illustrative purposes only and is not limited to the layout in each of the figures. Thus, layout parameters including but not limited to: 1) types of components (i.e., "buttons" and other input areas) included on each page, 2) a size of buttons on each page, 3) a shape of the button on each page (e.g. square, oval, rectangular, star-shaped, n-sided polygon, etc), 4) a color scheme for the buttons, 5) alpha-numeric text or symbols on each button and 6) background color scheme for the interface, may be varied. The input buttons may be rendered in 2-D. In some embodiments, the layout of pages for a particular game service interface may be customized according to the preferences of an individual player.

In particular embodiments, the buttons may be rendered with surface shading and textures to appear three-dimensional and may be animated. As example of an 3-D animation, when a button is touched on the touch screen, it may appear to move into the screen. Further, the symbols on the buttons may be appear to be animated in 2-D or 3-d. For instance, text on the buttons may appear to flash or move or characters and symbols on the buttons may appear to move. The characters and symbols may be selected according to a theme of a game played on the gaming machine. For instance, for a "little green man" game, an animation of a little green man taking a drink may be used to request a drink on the gaming machine.

An audio layout may also be included with each interface. For example, when a player touches a particular button on a game service interface displayed on the touch screen peripheral device or completes a particular task, a corresponding sound may be projected from an audio device located on the player tracking unit or a gaming machine. The sounds may include but are not limited to music, voice messages (e.g. "welcome" or "thank you") and noises (e.g. buzzing or beeping). In some embodiments, the audio layout may be customized according to the preferences of the user. For instance, voice message may be in a language selected by the player.

The interfaces may be generated on an output device connected to a gaming machine or in communication with the gaming machine. For instance, the interfaces may be generated on a display screen of a player tracking unit connected to the gaming machine, a main display or a secondary display of the gaming machine or on a portable device, such as cell phone, PDA (i.e., hand-held computer) or cell phone/PDA combo, in communication with a logic device coupled to the gaming machine. Further, via the gaming machine or some other local gateway, the portable device may also communicate with a remote server while providing various interfaces. In FIG. 4C, the generation of an interface on a portable device in wireless communication with a player tracking unit coupled to the gaming machine is described.

Figure 3A:
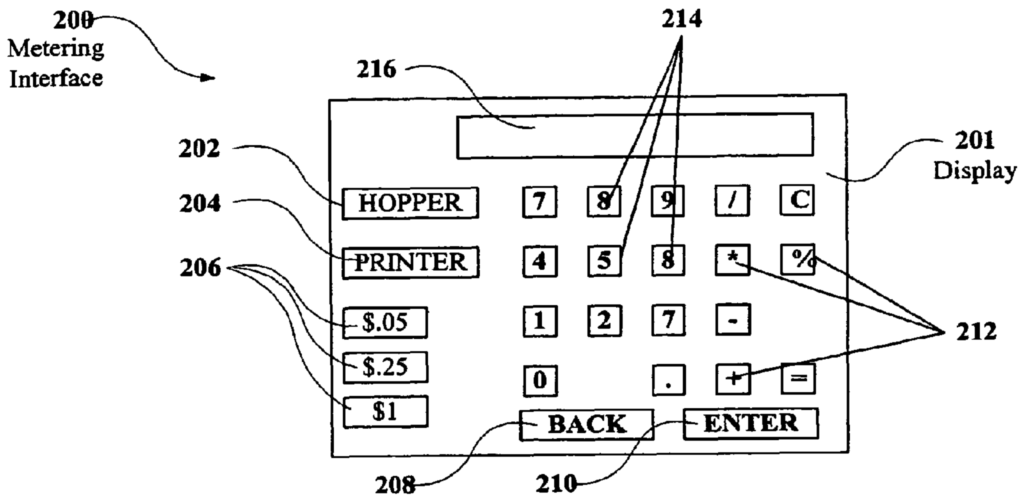
FIGS. 3A-3I are block diagram of game service interface displays for some embodiments of the present invention.

In FIG. 3A, a metering game service interface 200 that may be displayed on a touch screen display 201 is shown. The metering game service interface allows a casino operator to view metering information on the gaming machine. After logging into to the system using metering interface 200 or another interface, the casino operator may use the hopper button 202 to obtain metering information about a hopper on the gaming machine or a printer button 204 to obtain metering information about a printer on the gaming machine that issues printed tickets that may be used to obtain gaming credits on other gaming machines or redeemed for cash. The metering information may be displayed on the display area 216. The casino operator may use calculator buttons 208, 210, 212, 214 to perform arithmetic operations on the metering data. For example, "back" button 208 and "enter" button 210 may be used to enter data. The arithmetic function buttons 212 and numeric buttons 214 may be used to perform various arithmetic operations. The interface 200 may also include gaming specific function keys. For instance, the function keys 206 may allow the user to convert the metering information to different gaming machine denominations such as a nickel, quarter or dollar machine.

Figure 3B:
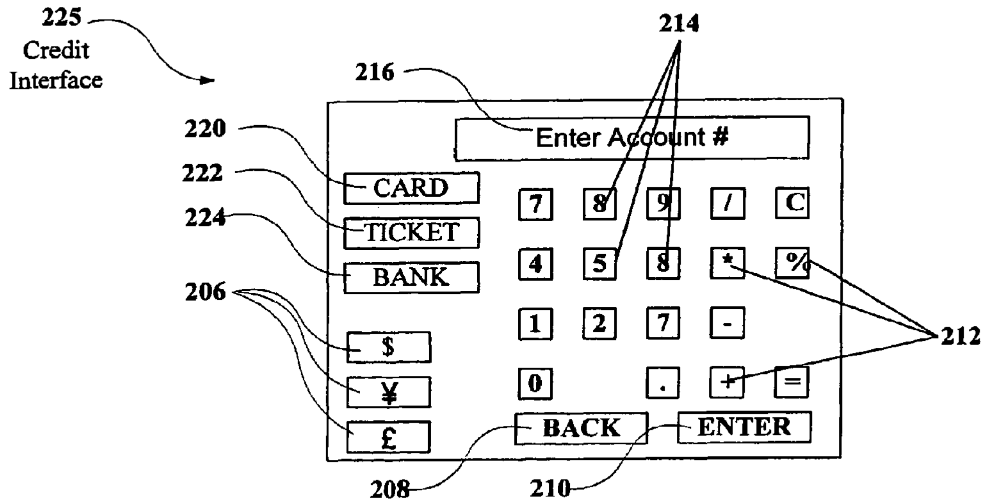

In FIG. 3B, a credit game service 225 that may be displayed on the touch screen display is shown. The credit interface 225 may be used by a player to transfer credits and cash winnings to various accounts accessible to the player. For instance, a player may be able to transfer a portion of their credits or cash to a smart card, a printed ticket or a bank account using the card button 220, the ticket button 222 or the bank button 224. The numeric buttons 214 may be used to enter account information and PIN numbers as well as to perform arithmetic operations. The function keys 226 may be used for currency conversion such as between dollars, pounds and yen. To transfer money to bank account, the player tracking unit or the gaming machine may communicate with the bank via a network connection available to the player tracking unit or gaming machine as described with respect to FIG. 1.

Figure 3C:
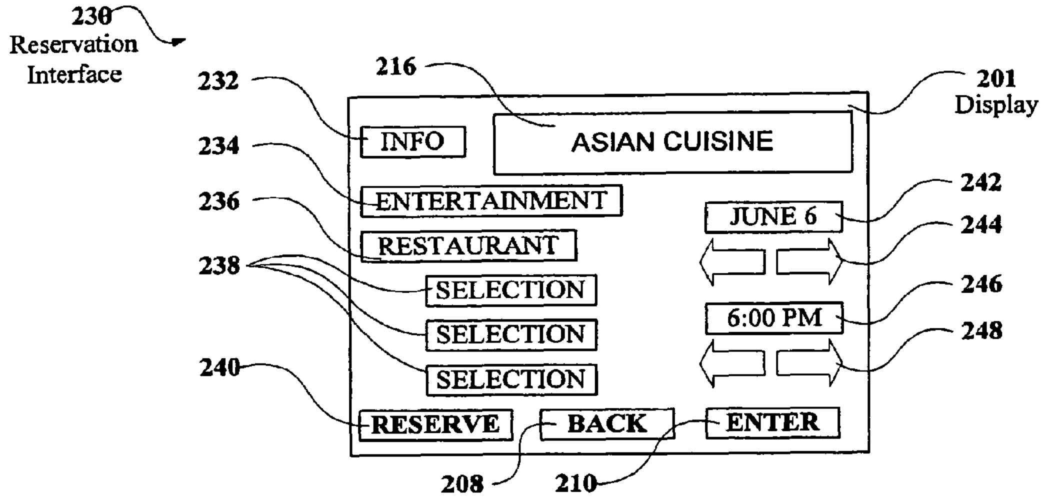

In FIG. 3C, a reservation interface 230 that may be displayed on the touch screen display is shown. The reservation interface may be used by the player to make reservations for food and entertainment at a gaming establishment such as a casino. When the entertainment button 236 or the restaurant button 236 is pressed, different selections in each category may be displayed. When the restaurant button 236 is pressed, three restaurant selections 238 are displayed. When the info button 232 is pressed, information about the entertainment selections or restaurant selections may be displayed in display area 216. For example, the info button 232 may be used to determine one of the restaurant selections serves "Asian Cuisine." Using the date button 242, date selection buttons 244, time button 246 and time selection buttons, a player may select a time and date for a reservation. Then, when the reserve button 240 is pressed, a request for a reservation may be sent to a remote reservation server 65 or another remote device as described with reference to FIG. 1. When the reservation has been confirmed by the remote server, a confirmation message may be displayed on the reservation interface. In some embodiments, when the gaming machine includes a printer, a printed receipt with the reservation may be issued to the player.

The reservation interface 230 as well as other game service interfaces described herein may be not available to all players using the touch screen interface. For example, in some embodiments, only players with a special "status" according to criteria determined by the gaming establishment may be able to access a particular game service interface. For instance, after a certain amount of game play by the player, the player may be presented access to the reservation interface 230 to obtain a free dinner or a show as compensation (e.g. comp) for the amount of their game play.

Figure 3D:
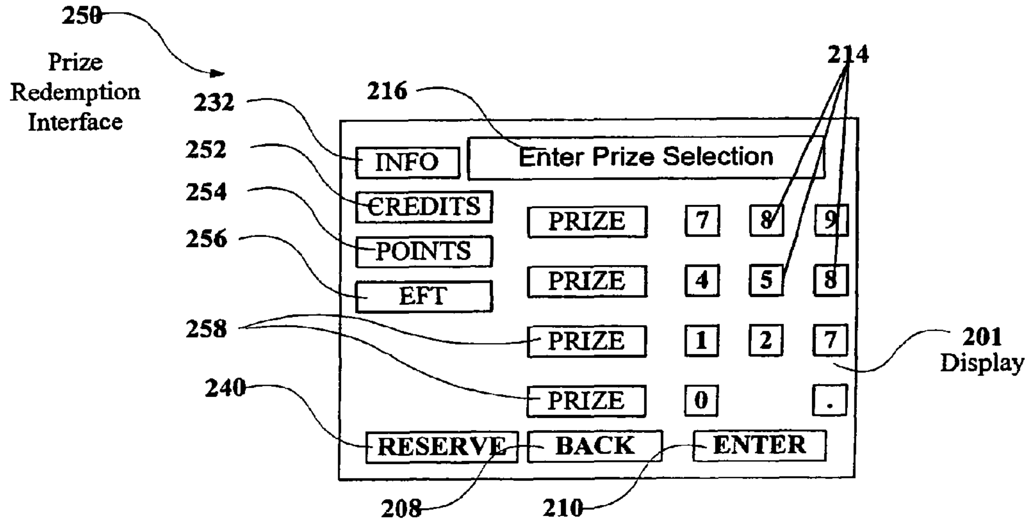
Figure 3E:
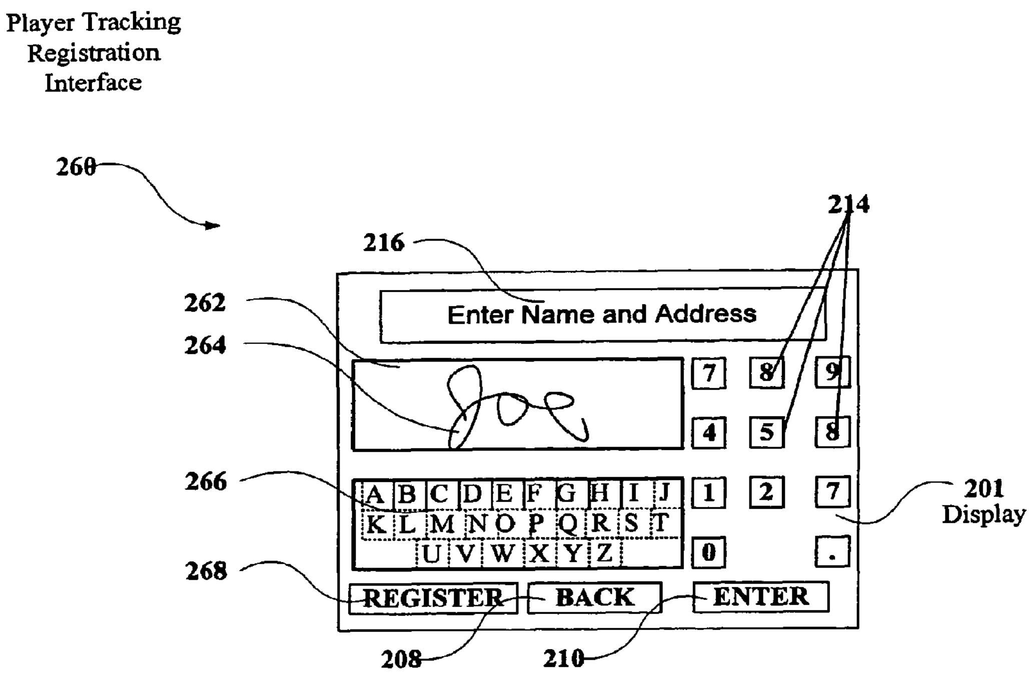

In FIG. 3D, a prize game service interface 225 that may be displayed on a touch screen peripheral device is shown. The prize interface may be used by the player to make redeem prizes awarded on a gaming machine. For instance, prizes may be awarded as: 1) a "jack pot" on a gaming machine, 2) based upon game play history that is tracked as part of a loyalty program or 3) part of a promotion at the gaming establishment. The prize buttons 258 may be pressed to select one of the prizes. When the info button 232 is pressed, information about the prize selection may be displayed in display area 216. Using the credits button 252, points button 254 and EFT (electronic finds transfer) button, a player may used a combination of credits available on the gaming machine, loyalty points and cash from a bank account to redeem a particular prize. The player may use an additional page of the prize redemption interface 250 to enter additional information such as a shipping address.

In FIG. 3E, a loyalty program registration interface 260 that may be displayed on a touch screen peripheral device is shown of the present invention. Using the loyalty program registration interface 260, a player that is not a member of a loyalty program, such as player tracking program, may use the interface 260 to join the program at the gaming machine as part of a "point of play" registration. In one embodiment, the player may obtain a "blank" magnetic striped card or another type of loyalty program instrument excepted by the card reader on the gaming machine such as a smart card. Next at the gaming machine, the player may request a "point of play" registration on the gaming machine from a menu of game services available on the gaming machine. A "point of play" registration on the gaming machine may be initiated before game play session has begun on the gaming machine (e.g. the player registers and then plays one or more games on the gaming machine), during a game play session on the gaming machine (e.g. game play by the player occurs prior to the registration and after the registration) and at the end of a game play session (e.g. the player registers but does not continue to play).

After the "point of play" registration has been initiated on the gaming machine, a logic device on the player tracking unit or the gaming machine may instruct the player to insert the "blank" magnetic striped card into the card reader and display the loyalty program registration interface 260 on the touch screen display. Using a finger or stylus, a player may enter their name, address and other identification information required for registration. Different combinations of registration information may be used and are not limited to a name and address. The required identification information may be entered using the numeric input buttons 214 and the alphabetic input buttons 266. The required information may be input in different languages and is not limited to English or other Romance languages. Thus, the input buttons 266 may be adapted for languages using alphabets other than a Roman alphabet.

In some embodiments, the touch screen display may be used with hand writing recognition software located on a logic device on the player tracking unit, player tracking server or the gaming machine to allow a player to write information on the display screen, such as their name and address, as a means of inputting this information. The "written" information may be converted to text by the hand-writing recognition software and stored electronically. For example, a player name, "JOE" 264 is written in a writing template area 262. The name may be recognized using hand-writing recognition software and converted to text. The required registration information may be written in languages other than English and using an alphabet or characters that are different than the Roman alphabet such as Kanji characters or Hiragana or Katagana alphabets which are used in Japan.

In addition, the player may sign their name in the writing template area 262. The player's signature may be recorded and stored so that it may be later used for identification purposes. For example, prior to the initiation of a player tracking session or another game service, a signature recorded from the writing template area 262 may be compared with a stored signature using comparison software. When the signatures compare, the player tracking session or other game service is allowed to proceed. When the signatures do not compare, the player tracking session or game service may be terminated or additional identification information may be required from the player before the player tracking session is allowed. Alphabetic input buttons and writing template areas with hand writing recognition and feature recognition software are not limited to the loyalty program registration interface 260 and may be used with any of the other game service interfaces of the present invention.

Besides a signature, other biometric information may be recorded from the player as part of the registration process. For instance, a camera may be used to record a picture of player's face or perform a retinal scan of a player's retina. As another example, a finger print reader may be used to record a player's finger print. A microphone may be used to record a player's voice. In one embodiment, the biometric information may be used for auditing purposes to identify that a player has actually registered. In another embodiment, the biometric information entered during the registration process may be used to validate a player's identity to initiate a loyalty program session. For instance, a recorded player's finger print may be used to validate the player's identity when they initiate a loyalty program session using a loyalty program instrument. The biometric input devices used in the registration process, such as a camera, finger print reader, a microphone may be located on a player tracking unit, a gaming machine, a casino kiosk or any other gaming device used to register a player.

After the player has entered the required information using the game service interface, the player may touch the register button 268 and a registration request message is sent to the player tracking service. The registration request message contains at least the identification information entered by the player and identification information from the loyalty point instrument used in the registration process such as a serial number recorded from the magnetic striped card or other identification information recorded on the loyalty point instrument. The registration request message may be generated by a logic device located in the player tracking unit or in the gaming machine such as the master gaming controller. After receiving a confirmation of the registration from the player tracking server, any additional game play on the gaming machine by the player may be recorded on the gaming machine and sent to the player tracking server as part of a player tracking session. In one embodiment, the gaming machine may issue a printed receipt to the player to confirm the registration process.

After registration, the magnetic striped card, or other loyalty point instrument used in the registration process, may be used by the player to initiate a player tracking session on other gaming machines or participate in other loyalty program activities available to the player through the loyal program using the magnetic striped card. Additional details of the point of play registration method of the present invention are described with respect to FIGS. 9 and 10.

The "point of play" registration method, described above, is not limited to touch screen displays located on a player tracking unit. The method may be implemented on a touch screen display used as the main display on the gaming machine or as a secondary display on the gaming machine. In addition, the method may be implemented on a touch screen display located on a casino kiosk. The casino kiosk may include a card reader and baskets containing blank magnetic striped cards or other gaming devices used as a loyalty program instruments. For instance, a smart card or a room key may be used as loyalty program instruments. At the kiosk, the player may use the blank magnetic striped cards and the touch screen display interface to register for a loyalty program such as a player tracking program as described above with respect to the gaming machine.

The “point of play” registration may also be implemented using many different input mechanisms or combinations of input mechanisms to enter a required set of registration information for a loyalty program. The input mechanisms may be located on a gaming machine or other gaming devices (e.g. casino kiosks and hand-held wireless devices) used to perform a “point of play” registration. For instance, a user may enter some of the registration information using a microphone and voice recognition software. In another examples, a user may enter registration information using alpha-numeric characters displayed on a display screen and a selection mechanism on the gaming machine to select the characters on the display screen. The selection mechanism may be one or more of the following but is not limited to input buttons, a joystick, a track-ball and a mouse.

In yet another embodiment of the present invention, the point of play registration may be initiated by a casino service representative. When a player is playing a game on the gaming machine and has not initiated a player tracking session, a light, the touch screen display (e.g., change color) or some other interface device (see FIGS. 4A and 4B) on the player tracking unit may indicate that the player may be a valuable to the casino as a member of their loyalty program such as their player tracking program. For example, when the player has bet an amount of money over some amount of time determined by the casino, the light on the player tracking unit may be activated. A passing casino service representative may notice the light and inquire whether the player would like to enroll in a player tracking program. The casino service representative enter the player's registration information on touch screen display located on a hand-held wireless device carried by the casino service representative and obtain card information from a card reader attached to the hand-held device. The hand-held wireless device may communicate with player tracking unit using a wireless communication standard such as but not limited to Bluetooth, IrDA (Infrared Direct Access), IEEE 802.11a, IEEE 802.11b, IEEE 802.11x, hiperlan/2, and HomeRF After entering the required information, a registration request message may be sent through a wire interface or a wireless interface on the player tracking unit to the player tracking server (see FIG. 4B), through a wireless interface on the gaming machine to the player tracking server or directly to the player tracking server from the hand held-device. After receiving a registration confirmation from the player tracking server, the player may be presented with an activated player tracking card which may be used to initiate a player tracking session on the gaming machine. An example of hand-held wireless device that may be used to provide the “point of play” player tracking registration is described in co-pending U.S. application Ser. No. 09/544,844, by Rowe, filed Apr. 7, 2000, tilted “Wireless Gaming Environment,” which is incorporated herein in its entirety and for all purposes.

IrDA is a standard for devices to communicate using infrared light pulses. A hand-held device, such as a PDA (personal digital assistant) may communicate with the player tracking unit and the gaming machine using infrared light pulses using the IrDA communication standard or some other infrared communication standard. Generally, infrared communication using IrDA requires line of sight communications.

The game service interfaces described above have been presented for illustrative purposes only as many other types of game service interfaces may be used with the touch screen displays of the present invention. For example, game service interfaces may be used that allow a player to specify various game playing preferences. Additional details of these interfaces, which may be used in the present invention, are described in co-pending U.S. patent application Ser. No. 09/819,152, by Paulsen, filed Mar. 27, 2001, titled “Interactive Game Playing Preferences”, which is incorporated herein in its entirety and for all purposes. As another example, a player may use the touch screen display and a game service interface to select different entertainment content sources, such as video programs, audio programs and Internet based services. The display screen may be used to display entertainment content such as a movie, a sporting event, advertising and other promotions. For Internet based services, the display with a touch screen may be used to operate a web-browser and other web-based applications. A few examples of entertainment content sources and interfaces, including Internet-based entertainment content sources, that may be provided with the touch screen display of the present invention are described in co-pending U.S. patent application Ser. No. 09/665,526, by Nelson, et al, filed on Sep. 9, 2000, and titled “Play Per View,” which is incorporated herein in its entirety and for all purposes. In yet another example, a player may use a game service interface to select promotions available to the player and receive a printed coupon used to obtain the promotion.

Figure 3F:
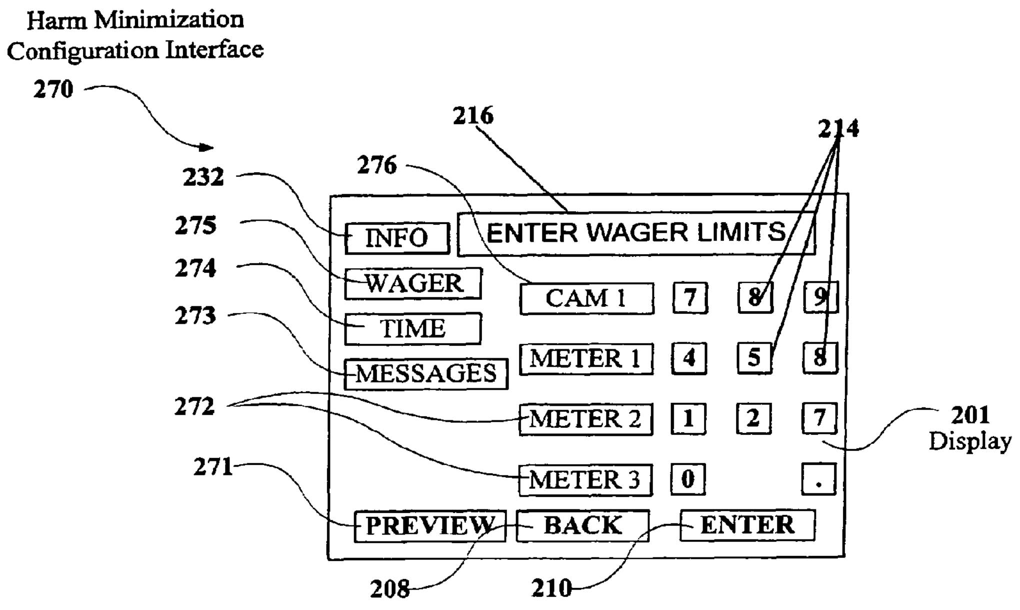
Figure 3G:
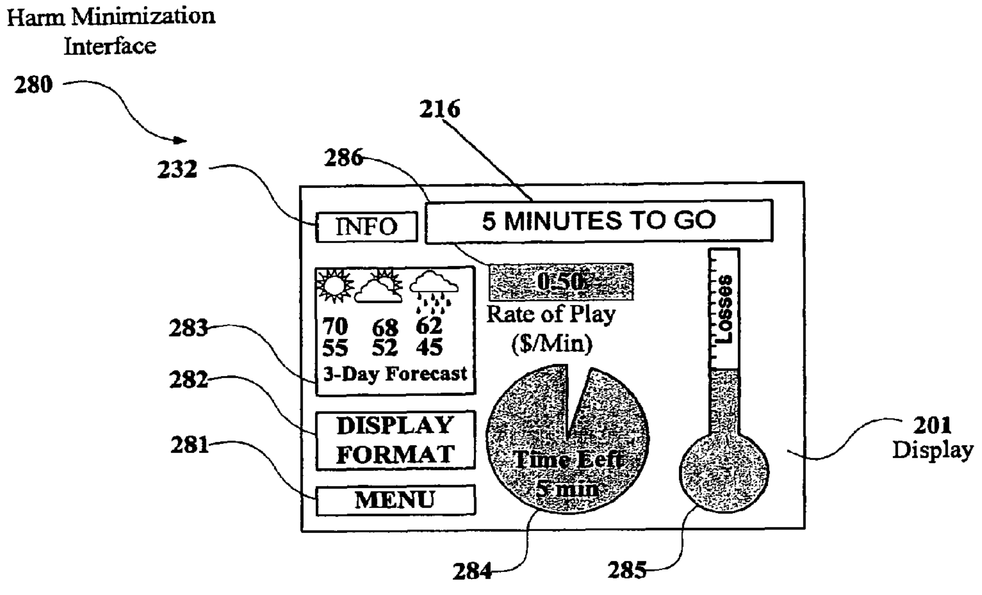

FIGS. 3F and 3G are block diagrams of game service interfaces for providing harm minimization on the gaming machine. Harm minimization may be defined as minimizing harm that may occur to a player while participating in a gaming activity. One aspect of harm minimization may be related to providing information and tools that can enable a player to make better decisions during participation in a gaming activity. For instance, a display for showing how long a player has been participating in the gaming activity may provide information that allows a player to make a better decision in regards to ending their gaming activity.

Another aspect of harm minimization may be related to setting limits to a player's game play. For instance, a limit may be set for an amount a player can wager over a period of time on a gaming machine. When the limit is exceeded, the player may be required to end their play on the gaming machine. The limits may be voluntarily self-imposed by a player, may be imposed by an operator of the gaming machine, such as a casino operator, or may be imposed by a regulatory body where the gaming machine is located. These limits may vary from player to player, from casino to casino or from gaming jurisdiction to gaming jurisdiction.

In a particular embodiment, harm minimization rules and requirements may be mandated by a particular gaming jurisdiction in which the gaming machine is located. The mandated rules may have been stipulated as a condition for allowing gaming in a particular gaming jurisdiction. For instance, a particular gaming jurisdiction may mandate that a clock for monitoring game play be made available on gaming machines. The player may choose to display or not display the clock for monitoring their game play. In another instance, the gaming jurisdiction may mandate that the clock for monitoring game play is prominently display while the player is playing a game on the gaming machine. In this case, the player does not have a choice in regards to displaying the clock.

In FIGS. 3F and 3G, an implementation of game service interfaces for harm minimization on a player tracking unit of the present invention is described. The present invention, however, is not limited to harm minimization on a player tracking unit. For instance, the game service interfaces for harm minimization may be implemented on a gaming machine without a player tracking unit. In another example, the game service interfaces may be displayed on one or more devices located at a table game, such as black jack or poker. In yet another example, these game service interfaces may be implemented on a gaming terminal connected to a remote server via the internet that provides games of chance to the gaming terminal. In a further example, the game service interfaces (see FIG. 4C) may be implemented on a portable hand-held device used by the game player.

In FIG. 3F, a game service interface 270 for configuring a harm minimization interface is shown. The game server interface 270 may be referred to as a harm minimization configuration interface. In one embodiment of the present invention, a user may customize the harm minimization interface. In another embodiment, the harm minimization interface may be non-customizable.

The info button 232 may describe an overview of the configuration options. In this example, the player may be able to select wager limits, time limits, messages and information for display on the harm minimization interface 280 in FIG. 3G. To select a wager limit, the player may select the wager button 275. The wager limit may be an amount the player can wager during a game play session on the gaming machine. The player may enter the wager limit using the buttons 214 on the interface.

A player may place a limit on the amount of time they may play. To select the time limit, the player may activate a time limit button 274 and input the time limit using the buttons 214. For instance, the player may enter a time limit of an hour for their play on the gaming machine. Other examples of limits a player may select include but are not limited to a rate of play, an amount lost, an amount won, an amount banked, a number of games played, a number of games where a win has occurred and a number of games where a loss has occurred. In one embodiment, the gaming machine may display a screen of pre-selected limits. For example, for the time limits, the screen may display ½ hour, 1 hour, 1½ hours, 2 hours and other and the gaming machine may be operable allow the player to select one of the these displayed limits.

As another example, for the amount banked, the player may select a percentage of their winnings to bank. For example, a player may choose to bank 5% of their winnings. As another example, a player may choose to bank a percentage of their winnings for all wins over a certain amount. For example, for a win over 100 credits, the player may choose to bank 25%, 50% or 75% of this amount. The amount banked may be transferred to a remote account associated with the player. The player's access to this account may be limited in some manner. For instance, the player may be prevented from withdrawing banked winnings for a certain time period, such as a day.

In another embodiment, the gaming machine may store and track banked winning for the player. At the end of their game play session, the gaming machine may print a cash-out ticket redeemable for the banked winning. The gaming machine may also store information needed to redeem the banked winnings to another type of instrument, such as but not limited to a smart card, RFID enabled device or a cell phone. The banked winnings, redeemable using the instrument, may be "time locked," such that the winnings may not be redeemed or used for additional game play for a set time period, such as a day.

In one embodiment, when a player selects a limit that is enforced on the gaming machine, the player may be instructed to state their selected limit. The stated limit may be recorded using a microphone placed on the gaming machine. The recorded information may be stored on the gaming machine or on a server connected to the gaming machine. The recorded limit statement may be used for a number of purposes, such as authentication, auditing and dispute resolution. For example, for authentication purposes, the recorded limit statement may be compared with a previously stored and authenticated sample of the player's voice to determine if the recorded limit statement was made by the player. As another example, for dispute resolution purposes, if a player later disputes that they did not set an enforced limit, the recorded statement may be played-back to the player confirm that they set the limit.

The limit statement may be recorded with other biometric information. For instance, the gaming machine may include a still or video camera (see FIG. 4C) and a still picture or movie of the player making the statement limit statement may be recorded. The gaming machine may include a playback program that allows and operator to locate and playback recorded limit statements. In another example, the player may select their limits and then enter a signature on the gaming machine, such as via a touch screen on the gaming machine. Details of electronic signature input that may be used with the present invention are described in co-pending U.S. application Ser. No. 09/946,905, filed Sep. 4, 2001 and titled, "Electronic Signature Capability on a Gaming Machine," which is incorporated by reference herein in its entirety and for all purposes.

The audio/video record feature may be also applied in other applications on the gaming machine and is not limited to harm minimization. In general, it could be used for authentication for any transaction performed on the gaming machine. For instance, when a player transfers money to the gaming machine from an outside account to the gaming machine. The player may be asked to verbally confirm their intentions and a movie with video and sound of them making the statement may be recorded. In another embodiment, the gaming machine may include logic to record a movie at specific instances of game play, such a when a player wins a large jackpot. The video could be used to determine that the winner of the jackpot was eligible (i.e., not an underage player) or for entertainment purposes. For instance, a small video clip of the player winning could be sent to the player's picture cell phone or to an e-mail account. The player could later play back the video clip to remember the event and to show it to friends.

As previously described, in some embodiments, the player may select various limits in regards to their game play. In other embodiments, a gaming machine operator or a gaming jurisdiction may impose the limits. For instance, in a casino with a limited number of gaming machines and crowded conditions, the casino may impose a limit in regards to the amount of time each player can play. In another example, a gaming jurisdiction may limit losses over a time period for a player to a particular amount.

The player tracking unit and or gaming machine may monitor parameters and perform calculations necessary to track limits. For instance, when a limit for the rate of play has been set, the gaming machine may calculate the rate of play i.e. the amount wagered over a particular time period. When a limit, such as a time limit or a wager limit is reached, the gaming machine may take a number of actions or combination of actions to discourage further game play. As an example, the gaming machine may end the game play session by not allowing the player to continue playing. In another example, the gaming machine may not allow the player to make another wager for a period of time. In yet another example, the game player may display a particular message, such as "You have reached your limit. Stop Playing!" In a further example, the gaming machine may lower the sound the level on the gaming machine or decrease the graphics resolution to discourage further game play. In yet another example, the gaming machine may limit a maximum wager amount that can be made for each game.

In a particular embodiment, the player may be required to provide identification information, such as an account number and pin or name and pin, each time they engage in game playing at a gaming machine. The gaming machine may contact a central server with this information. The central server may track the player's game playing, such as time played and amount spent, on a plurality of gaming machines. The central server may keep track of harm minimization limits set by the casino, gaming jurisdiction, player or combinations thereof. When set limits are exceeded, the central server may send messages and/or commands to the gaming machine indicating a limit has been exceeded. In one instance, the message may contain information that indicates a limit has been exceed and from the information a logic device on the gaming machine, such as a master gaming controller or a logic device on the player tracking unit, determines the correct response. In another embodiment, the central server may send a command directly to the gaming machine where the command indicates a response that the gaming machine is to implement. For instance, the central server could command the gaming machine to terminate game play and display a message indicating what limits were exceeded and when game play can resume again or the central server could simply command the gaming machine to display a message, such as "You have lost 'x' dollars."

In yet another embodiment, a cashless system may be used to limit a player's spending for harm minimization purposes. In this instance, the gaming machines may only accept cashless instruments, such as printed ticket vouchers for game play. Prior to beginning their game play, the player may be required to identify themselves and then purchase a cashless instrument with a certain value below a set limit, such a $500 dollars. Each time the player plays a game at the gaming machine, they provide their cashless instrument to the gaming machine. After they finish at the gaming machine, their cashless instrument (e.g., a smart card) is updated with their available credits, which may include amounts won and lost, or a new cashless instrument (e.g., a printed ticket voucher) is generated with this information.

The cashless instrument transactions generated in a chain starting with the original purchase amount may be valid for only a particular time period, such as a day. After that the player may be forced to cash-out the cashless instrument. As an example, a player may make an initial purchase of a cashless instrument of a printed ticket voucher for $500 dollars, which is the maximum amount that can be spent in 24 hours. The printed ticket voucher may encode a time/date issued and a remaining time. This information may be encoded in a format that can be read by the player.

Next, the player may use this instrument for games at a gaming machine and win $200 dollars and receive a new printed voucher for $700. The new printed voucher may encode the time that the first voucher was issued i.e., the one that started the thread of transaction and the time remaining for the thread. Next, the player may use the voucher with $700 at a table game. After playing, they may be issued a new ticket voucher with $200. Again, this printed ticket voucher for $200 may encode the time the first ticket voucher was issued and the remaining time. Next, the player may not use the printed ticket voucher for $200 during its time remaining When the player tries to use the voucher for game play at a gaming machine, the gaming machine may not accept the ticket but may indicate that the printed voucher may be redeemed for cash. The player may then cash-out the voucher and then purchase a new printed voucher with a value and start the process over again. Details of a cashless system that may be used with the present invention are described in co-pending U.S. application Ser. No. 10/406,911, by Rowe, filed Apr. 2, 2003 and titled "Cashless Transaction Clearinghouse, which is incorporated herein by reference and for all purposes.

In one embodiment of the present invention, the player may be able to select certain message or messages for display on the harm minimization interface. In one embodiment, a list of available messages and/or mandated messages may be displayed when the messages button 273 is selected. Further, when the messages button 273 is selected an alphanumeric interface may be displayed (e.g., 266 in FIG. 3E). In another embodiment, the player using a microphone may be able to record a voice message that can be later played back.

In particular embodiments, the player may select to display a message indicating an amount lost at particular time intervals or at random time intervals. The amount lost that is displayed may be calculated at the time the message is generated. The time interval may be entered via the buttons 214. In another example, the amount lost may be displayed when the player has lost a certain amount or each time a certain amount has been lost. For instance, each time a player has lost $100 dollars, a message may be displayed that says you have lost $100 dollars over the following "x" time period where a device on the gaming machine tracks the amount of time it took to lose $100 dollars. Of course, the present invention is not limited to tracking monetary amounts in dollars and other currency amounts may be tracked with the present invention. Further, the messages may be in other languages depending on where the gaming machine is located and/or the player's preference.

In yet another embodiment, the player may choose to display a message such as "I am playing for entertainment" or "You have been playing 5 straight hours. Take a break." In yet another example, when the player's rate of play exceeds a particular amount, the player may select to have a message displayed, such as "You are playing to fast. Slow Down." As previously described, the gaming machine may be configured to display certain messages whether the player has selected the message or not. These message may mandated by the gaming jurisdiction in which the gaming machine is located. The message can be displayed on display 201 or another display on the gaming machine.

The cam button 276 may be used to select different video cams that may be displayed on the gaming machine, such as on display 201. For example, a player may be to select a video feed from outside the casino. The cues provided from outside may help the player limit their game play by allowing them to keep better track of time. In another example, the player may be simply interested in the weather outside in regards to whether it is raining or not. As another example, the harm minimization interface 280 may be configured to display still images, such as a picture of the player's spouse, family or relative at certain times.

The metering buttons 272 may be used to select different meters and formats for displaying the meters. The meters are typically related to aspects of the players game play. For instance, an amount wagered, an amount of time played, an amount wagered per time, an average amount wagered per game, an amount won, an amount lost, an amount lost per time, an amount won per time, a ratio of the amount won versus the amount wagered, a number of drinks ordered/consumed, a number of games played, an amount won or lost per game, etc. In particular embodiments, these meters may be plotted as a function of time or as a function of games played. The formats (see FIG. 3G for a few examples) may be any combination of plots, graphics and colors, such as pie charts, bar graphs, etc.

The player may use the preview button 271 to review any limits they have set or that are imposed. Further, the preview button 271 may be used and to preview a display of the harm minimization interface 280 that they have configured (see FIG. 3G). After, the player has completed their selections, the player may engage the enter button 210 to complete the configuration.

In one embodiment, a configuration of a harm minimization interface may be saved for the player. For instance, their personal configuration may be save to an account, such as a player tracking account, on a remote server. In another example, their personal configuration may be encoded on a printed ticket, which is issued to the player. The player may insert this ticket into another gaming machine to reconfigure the gaming machine with their personal configuration. In yet another embodiment, their personal configuration information may be downloaded to a smart card, cell phone, PDA, hand-held computer or the like for storage and later uploaded to a gaming machine with an interface compatible with the device on which the information is stored.

In FIG. 3G, an example of a configured harm minimization interface 280 is illustrated. This player tracking unit may be configured to display interface 280 on its display screen 201 (see FIGS. 4A-4C). In general, this interface 280 may be generated on any of the video displays located on the gaming machine or adjacent to the gaming machine. In one embodiment (see FIG. 4C), the interface 280 may be generated on a hand-held device, such as a PDA or cell phone, carried by the player.

The interface 280 illustrated in FIG. 3G provides 3 meters: 1) a rate of play meter 286, a time remaining meter 284 and a loss meter 285. The present invention is not limited to the display of information from 3 meters. One or more meters or no meters may be displayed on the interface 280. A logic device may adjust the size of the meters to accommodate a specified display area. If the display area is too small to accommodate a desired number of meters, then the format of the meters may be adjusted, such as using text-only instead of graphics, or the gaming machine may cycle through the meters, i.e., display each one for a limited amount of time and then display the next one.

The rate of play meter 286 is in a bar format. The length of the bar is used to indicate the rate of play, which is shown as 50 cents per minute. The rate of play may vary over time and the bar graph may be updated as the player's rate of play increases or decreases. In one embodiment, the player may set a limit for a rate of play and the rate of play meter may flash and/or change colors and in addition a warning sound may be emitted when the player exceeds their rate of play. In another embodiment, a logic device on the gaming machine may limit a player's maximum bet to decrease their rate of play.

The time left meter 284 shows a pie graph of time remaining where the slice of pie gets smaller as the time remaining approaches zero. The player may have configured a time limit using the configuration interface 270 and the meter 284 may reflect the time remaining based upon the limit. A message, "5 minutes to go" is shown in display area 216. This message may be based upon the time limit that has been set. It may flash periodically and at different intervals, such as at ½ hour to go, 15 minutes to go, 5 minutes to go and 1 minute to go.

The loss meter 285 shows the amount a player has lost using a thermometer graphic. The thermometer may include markings for allowing the player to determine the amount they have lost or a marking indicating a limit. The filling in the thermometer may go up and down as losses decrease or increase and change color as a loss limit is approached. Again, text message may be coordinate with the loss meter, such as "Approaching loss limit."

Although specific meter graphics are illustrated in FIG. 3G, it should be appreciated that any suitable graphical construct may be used to convey the metering information. In some implementations, the player may be able to change the format of the displayed meters using the display format button 282. For instance, the pie graph meter 284 may be changed to a simple text output. As another example, different variables, such as amount won or an amount lost may be plotted versus time in a line plot. The display format button 282 may be also used to change the metering information that is displayed and the number of meters that are displayed at any one time. For instance, the player may select 5 meters to display but only one at a time and the interface may cycle through each meter. The menu button may be used to reconfigure the interface and may provide access to the harm minimization interface described with respect to FIG. 3F.

The display area 283 provides an example of the one of the cams described with respect to FIG. 3F. In this example, a weather cam is displayed. The weather cam 283 displays the weather outside the casino and a local weather forecast. In area 283, a 3-day weather forecast is shown.

Figure 3H:
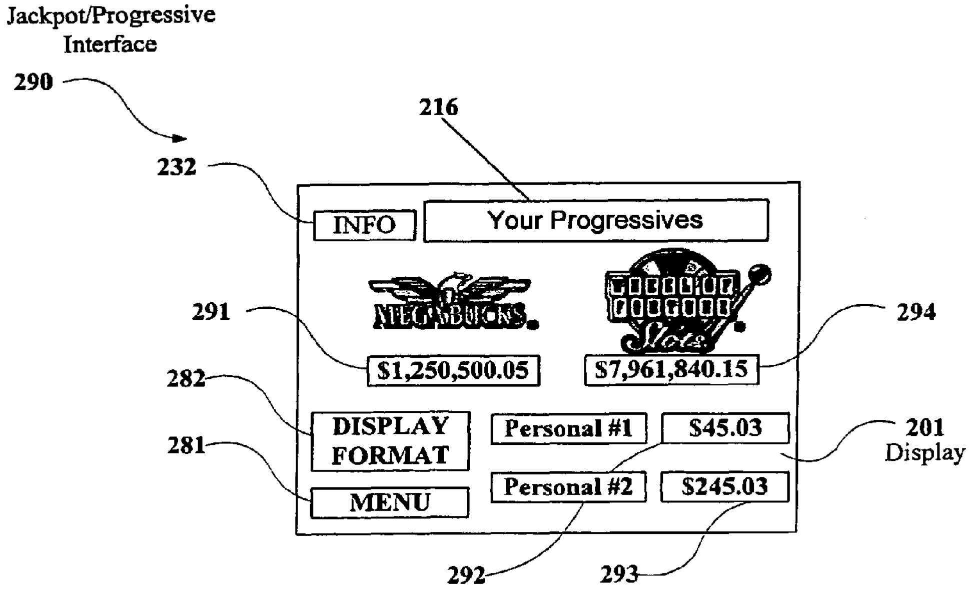

In FIG. 3H, an interface 290 for displayed different jackpots is shown. The interface 290 may be configured to allow a number of different jackpots to be displayed. In one embodiment, the interface may be adapted for allowing a player, a gaming machine operator or both to select different jackpots for display. For promotional purposes, the gaming machine operator may choose to select different jackpots for display. When the interface 290 has been configured by a player, the player's selection may be stored to a device, such as a cell phone, PDA, smart card, etc. carried by the player or may be stored to a remote account. The stored selection information may be used to reconfigure the interface 290 on different gaming machines that a player may utilize The info button 232 may be used to display a list (textual and/or graphical) of the jackpots that may be displayed. In one embodiment, different progressive jackpots may be displayed on the interface. The progressive jackpots may or may not be available for game play on various gaming machines within a casino where the gaming machine is located. In the FIG. 3H, two progressive jackpots that have been selected for display, Megabucks™ and Wheel of Fortune Slots™ by IGT (Reno, Nev.) are shown. Under a graphic representing each progressive jackpot, a jackpot amount, which may be continually updated on the gaming machine, is shown. The updates to the gaming machine may be provided from a remote server in communication with the gaming machine.

In one embodiment, the gaming machine may be adapted to provide a map of a casino for allowing a player to locate a gaming machine where the progressive jackpot is available. For example, when the "Megabucks™ " graphic is selected on the touch screen, a map may be shown on the display 201 that shows the location of the current gaming machine, various gaming machines and other landmarks on the casino floor and a location of a gaming machine(s) providing the progressive jackpot that has been selected. The location of the current machine and the gaming machines providing the selected jackpot may be highlighted on the map. Further, a line may drawn between the current location and the desired location (e.g., the location where the selected progressive jackpot is provided). In one embodiment, the gaming machine may be adapted to be print out a map for the player.

Figure 3I:
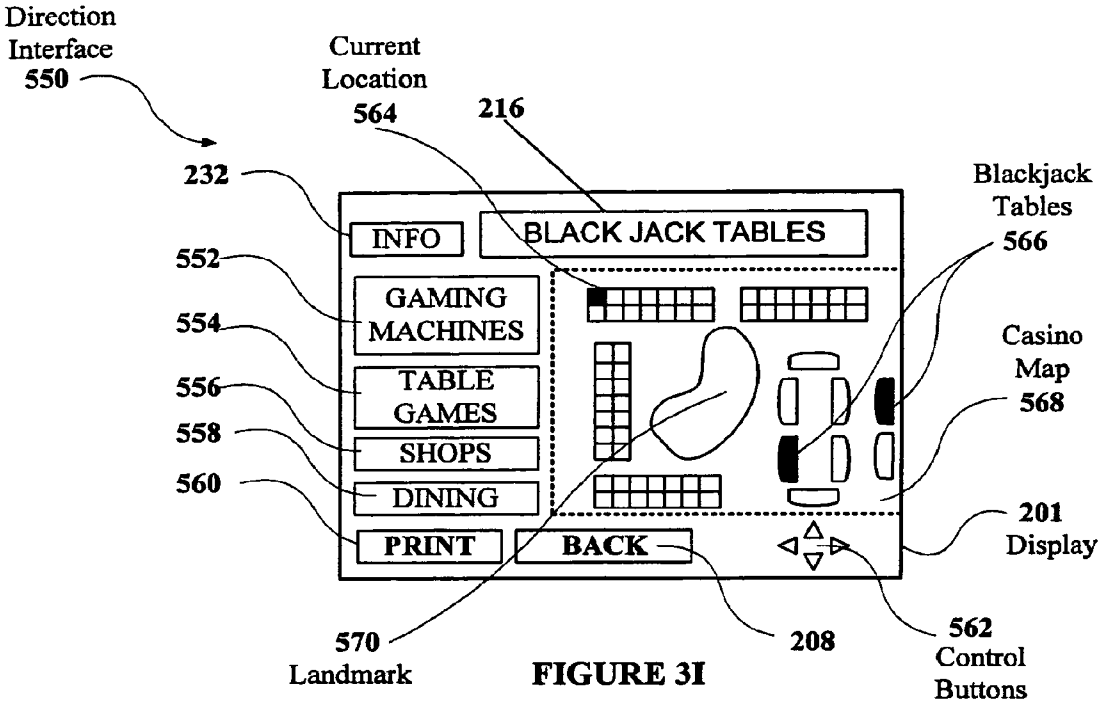

The mapping service described in the previous interface is not necessarily limited to locating a gaming machine providing a progressive jackpot. In one embodiment, a player may be able to select from variety of locations within a casino complex and the gaming machine may be operable to provide a map and/or directions to this location. An example of a mapping interface 295 is shown in FIG. 3I.

Returning to FIG. 3H, in one embodiment of the present invention, the interface 290 may be adapted to display personal jackpots maintained for the player. Two personal jackpots, 292 and 293, are shown in the picture. In the gaming industry, a percentage of a player's spending at a casino is often awarded back to the player in the form of comps (complimentary awards). For example, if a player spends enough, the player may be awarded a comp of a free meal or a free hotel night. In embodiments that incorporate a personal jackpot, a percentage of the player's spending may go towards funding a personal jackpot that can only be won by the player. The funding of the jackpot may be based upon a player's spending at various gaming activities, such as gaming machines, table games and sports bets as well non-gaming related activities, such as shopping at particular shops, eating at a particular restaurant, selecting a hotel room of a particular value or utilizing other casino/hotel services.

The funding rate may vary from activity to activity and may be vary depending on an amount spent. For instance, the funding rate for various activities may be higher initially to quickly fund the personal jackpots, 292 and 293. Then, once the personal jackpot reaches a certain level, the funding rate may decrease. Then, for higher amounts spent, the funding rate may increase.

Unlike other complimentary awards that are valid for a particular service, such as dinner at a particular restaurant, the jackpots, 292 and 293, may be awarded as cash. The player may use this cash in the manner of their choosing. In one embodiment, a portion or all of a personal jackpots, 292 and 293, may be awarded as scrip that may be valid for various activities or services but may not be directly redeemed for cash. For example, the scrip may be valid for promotional credits on a gaming machine where the player may use the promotional credits for game play and may collect any winning resulting from the game play but may not convert the promotional credits to cash. As another example, the scrip may be valid for play at a table game, such as black jack. In another example, the scrip may be applied for a service available at a casino/hotel, such as a meal at a restaurant or a service at a spa.

A scrip or cash award may be made directly at the gaming machine or may be credited to a player's account. For instance, a ticket voucher, redeemable for cash or redeemable as script may be printed at the gaming machine. As another example, an award of a cash or scrip amount may be credited to a cashless instrument carried by the player, such as a smart card, phone or hand-held computer.

In FIG. 3H, the two personal jackpots may represent jackpots funded from different sources. For instance, jackpot 292 may be funded from game play activities while jackpot 293 may be funded from non-gaming activities. In another example, the two jackpots, 292 and 293, may represent a cash value versus a scrip value. For instance, when the player wins a personal jackpot, the player may be able to select the cash jackpot value 292 or the scrip jackpot value 293.

In one embodiment, a personal jackpot may be funded from activities linked to a group of players. For example, a player may wish to join with their family members and/or friends to form a jackpot group. As another example, attendees of a trade conference or a convention may be registered in the group as part of their registration for the conference. To join the group, each member may have to register in some manner to indicate that they wish to participate in the group. In this embodiment, only registered members of the group are eligible for awards from the group jackpot pool. A determination of an award from the group jackpot may be made at the gaming machine, the remote device or combinations thereof.

When a player provides identification information at a gaming machine, a determination may be made as to whether the player is eligible to win any group jackpots. The group jackpots that the player is eligible to win may be displayed on the jackpot interface. In one embodiment, a player may be eligible to join one or more groups providing group jackpots and the groups that a player is eligible to join may be displayed on the jackpot interface. The jackpot interface may allow the player to join the group via a registration process. In one embodiment, the player may be required to pay a fee to join a group. In another embodiment, the player may be automatically registered in a group as a result of an event occurring at the gaming machine. For example, the player may be registered for a particular group jackpot when a particular outcome occurs while they are playing a game of chance at a gaming machine.

A remote device, such as a player tracking server, may monitor a group's contributions to the group jackpot and update the jackpot total. When a member of a group is playing at a gaming machine, the group jackpot total may be displayed at the gaming machine via the jackpot interface. Further, when one member of the group wins an award, other members in the group may be notified of the identity of the person who won the award. For example, when Joe and Bob are in a group and Joe wins a portion of the group jackpot, Bob may receive a message, such as "Joe won an award of X dollars from the group jackpot." Details for determining a location of a player at a gaming machine that may be used with the present invention are described in U.S. application Ser. No. 09/655,526, by LeMay, et al, filed Sep. 19, 2000 and titled, "Play Per View," which is incorporated herein by reference in its entirety and for all purposes.

The personal jackpots may be maintained, updated and accessed via communications with a remote server, such as a player tracking server, may be maintained on a device carried by the player, such as a smart card, cell phone, PDA, etc. For example, eligible transactions may be forwarded to the remote server. The remote server may then update the jackpot and regularly send updates that are displayed on display 201. As another example, the jackpot amount may be stored on a smart card carried by the player. An initial jackpot may be stored on the smart card and downloaded to the gaming machine at the beginning of a gaming machine. Then, a logic device on the gaming machine may update the jackpot amount on the gaming machine during the game play session. Details of using a portable device for providing personal jackpots are described in co-pending U.S. application Ser. No. 09/718,974, by Rowe, filed Nov. 22, 2000 and entitled "EZ Pay™ Smart Card and Ticket System," which is incorporated herein in its entirety and for all purposes.

In yet another example, when a transaction occurs at a location not in contact with a remote server, certain transactions may be stored on the device carried by the player and then uploaded to the remote server when the carried device by the player comes in contact with a device in communication with the remote server. The remote server may then receive a record of the transaction, validate it and then update the personal jackpot. For example, the player may make a purchase(s) of an item at a shop(s) that is not in contact with a remote server. The record of this transaction may be stored to a cell phone carried by the player. Later, the player may engage in game play at a gaming machine connected to the remote server. During the game play session, the record of the transaction stored on the phone may be uploaded to the remote server via the gaming machine and the personal jackpots 292 and 293 may be updated via communications with the remote server to reflect the uploaded transactions.

The personal jackpots may be triggered from events related to gaming or other activities. In one embodiment, a fixed probability for winning the personal jackpot may be assigned to the jackpot and each time the player engages in an approved activity, a random number may be generated and compared with criteria, which may include a probability of winning, to determine whether the player has won the jackpot. For instance, approved activities may include a play of each game at a gaming machine, a purchase at a shop over some amount, a purchase at a dinner over some set amount, checkout at a hotel, etc. In another embodiment, the winning of the personal jackpot may be triggered by a particular event occurring on the gaming machine, such as when a particular combination of the symbols appears on the gaming machine. The determination of whether a player has won their personal jackpot may be made independently of the outcome of a game of chance played on the gaming machine and the resulting payout may be a portion of the personal jackpot or the entire jackpot.

The probability of winning may vary with time. For example, as the personal jackpots, 292 and 293, increase in size, the probability of winning either of the jackpots may increase. Thus, in this instance, the player will be more likely to win larger jackpots and less likely to win smaller jackpots. For example, the probabilities of winning jackpots 292 and 293 may be selected such that the probability of winning jackpot 293 may be greater than probability of winning jackpot 292. In one embodiment, the probability of winning a jackpot may be set to zero until the amount of the jackpot reaches a certain value.

A described with respect to FIG. 3H, a player may wish to learn of the location of a gaming machine where a certain progressive jackpot is available. In FIG. 3I, a directions interface 550 is shown that provides a map with locations of interest to a player. The directions may be in the form of a map, text (e.g., turn right, go straight, etc.), combinations of a map and text, voice directions that could be emitted from the gaming machine or any other information format that provides the player enough information to navigate to the location of interest from their current location. The directions may be viewed on the gaming machine and/or output to the player in some manner, such as a downloaded to a device carried by the player or a printout of directions output via a printer on the gaming machine.

The interface 550 may include a number of buttons that allows a player to select from lists of locations that are categorized according to a theme. For example, buttons, 552, 554, 556 and 560 allow locations for different types of gaming machines, table games, sports book, shops, dining and other services (e.g., gym, spa, pool, hotel check-in, travel/entertainment services, concierge, etc) to be generated on display 201. In this embodiment, the term "location" is used to indicate a place where the player can find a service or activity of interest to the player. The place may be located within a casino, within a casino complex (e.g., a casino, restaurants, hotel, parking garage, etc), locations nearby the casino (e.g., affiliated casinos, general attractions, nearby shops and service providers, such as a pharmacy) or any other location of interest to the player.

The buttons may lead to various sub-buttons or menus. For example, when the gaming machine 552 button is selected, the player may be able to select from a list of different types of games, progressive games, bonus games (e.g., Wheel of Fortune™) that are available for play in a particular casino. For example, using the interface, the player may be able to locate all gaming machines or nearby gaming machines that access to the Megabucks™ progressive game. As another example, the may player may be able to locate all restaurants or snack bars that serve a certain type of food, that are open and do not require reservations. In general, the player may be able to select multiple features of an item of interest, such as a gaming machine, gaming device, table game, bar or restaurant, and search for locations where those features are provided.

In one embodiment, when the player has provided search criteria for a location and no locations satisfy the search criteria, the gaming machine may display locations that satisfy at least one criterion of the search criteria. The directions interface may list criterions for each location that are satisfied. When multiple locations satisfy a player's search criteria, the interface 550 may display the nearby locations first or only the nearby locations.

In one embodiment, the direction interface 550 may have access to status information for locations of interest. For example, the direction interface may have access to information indicating whether a gaming machine(s) of interest is currently being played, seats at a black jack table are available or a shop. This information may be displayed on the interface or may be used to narrow a search criterion. For example, in one embodiment, the direction interface 550 may only highlight gaming machines of interest that are not being played or table games of interest with an open seat. An advantage of providing status information for the location of interest is that a player may not wish to embark to a location that is currently not available to provide the service of interest to the player.

The interface 550 may be adapted to accept multiple input selections to limit the locations that satisfy the search criteria. For example, using the interface 550, a player may be able to locate gaming machines that accept a certain denomination, such as nickel slots, and provide a particular main game. As another example, using the interface 550 may be able to determine the location of a type of table game with a certain bonus game.

After the player has selected one or more criterion that match particular locations in the casino a map showing the locations may be provided on the interface 550. For example, in FIG. 3I, the player has provided inputs indicating that want to know the locations of blackjack tables. The display area 216 provides the message "BLACK JACK TABLES" to indicate the player's location selection.

On the interface 550, a map 568 of a portion of the casino is shown. The map includes banks of gaming machines, i.e., the squares, a landmark 570 and a number of table games. The landmark 570 may be a fountain or some other landmark on the casino floor. The player's current location 564, which is a gaming machine, is highlighted in black and the player's selected locations, the black jack tables 566, are also highlighted in black. Various methods, such as different colors, flashing colors, etc. may be used to highlight the locations of interest to the player.

The map itself may be rendered using many different methods. For example, the map may provide simplified line drawings. As another example, the map may provide actual pictures of particular items. The map may be rendered in black and white or in color depending on the type of display that is used on the interface.

The player may use the map to quickly arrive at their location(s) of interest. In one embodiment, the interface 550 may provide directions, such as a line that connects the current location 564 to one or more locations of interest. In another embodiment, the player may be able to navigate in the map using the control buttons 562, In yet another embodiment, using the print button 550, the gaming machine may be operable to print a copy of the map that the player may take with them using the print button 560. The printed map may include promotions that can be used at the location of interest to the player. For example, if the player has selected a particular restaurant, a map with a coupon for the selected restaurant or another restaurant may be provided. As another example, when the player has select a game played at a particular gaming machine as a location of interest, the directions interface may a coupon with promotions credits that may be used to play the game of interest.

In an additional embodiment, the directions interface 550 may be used to encourage a player to go to particular locations independently of whether the player has indicated the location is of interest to the player. For example, the interface 550 may flash locations where a particular promotional activity along with a message providing details about the activity. For instance, a location where learning session about various casino games is being provided may be displayed on the interface and messages providing details of the learning session may be displayed on the interface. Further, the printing option may be used to print coupons with maps that encourage a player to go to restaurant. For example, a printed ticket may be provided with a promotion for a restaurant and a map of the casino floor where the restaurant is located.

The promotions provided on the interface 550 may be also linked to current status information about the various locations that are shown on the mapping interface. For example, if not many people are playing the blackjack or other table games and a casino operator wants to encourage more people to play table games, the mapping interface may be used on a number of gaming machines to provide the locations of the table games and any promotions that are currently being offered. Further, to encourage the players viewing interface 550 to move to the location being promoted by the casino, the gaming machines may be instructed to print tickets for the selected location. As another example, if business was slow at a particular restaurant and busy at other restaurants, the directions interface 550 could be used to show the locations of the various restaurants and status information for each, such as a current waiting time. To encourage business at the slow restaurants a coupon with the directions could be printed.

Figure 4A:
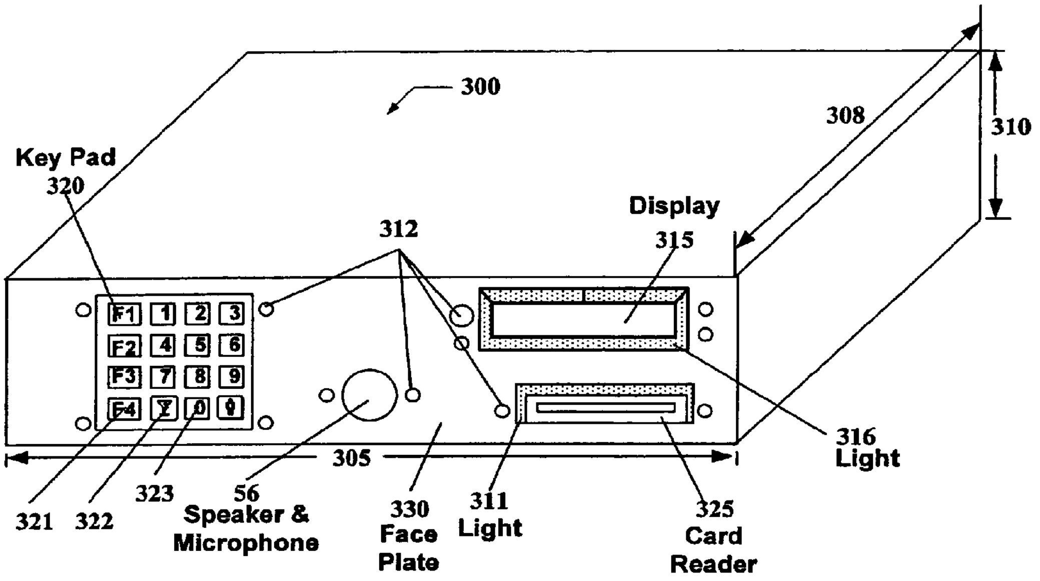
FIGS. 4A and 4B are perspective diagrams of player tracking units in accordance with specific embodiments of the present invention.
Figure 4B:
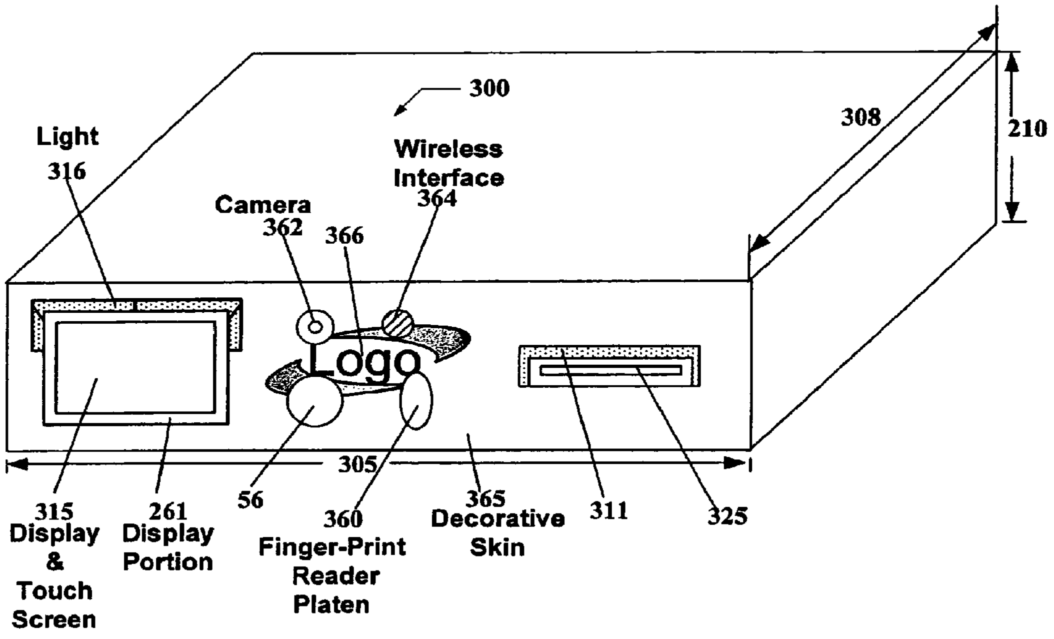
Figure 4C:
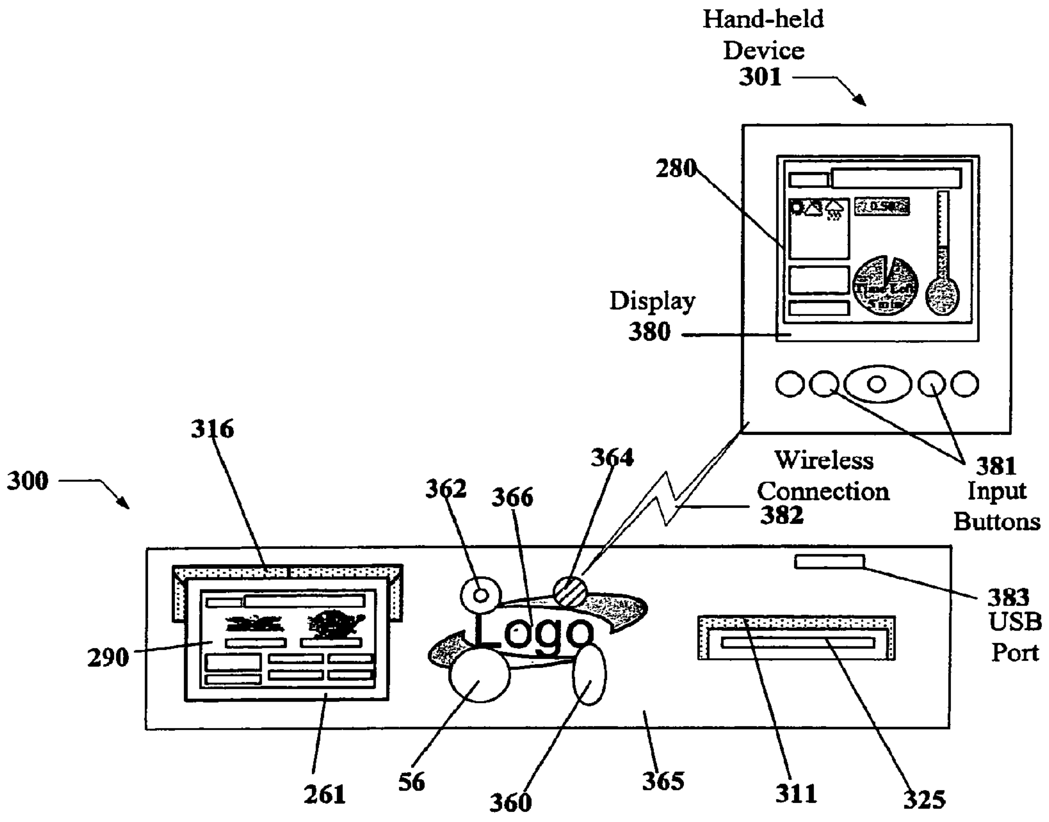
FIG. 4C is a block diagram of player tracking unit communicating with a hand-held portable device via a wireless interface.

FIGS. 4A and 4B are perspective diagrams of different embodiments of player tracking units of the present invention. FIG. 4A is a front diagram for a housing or chassis 300 enclosing a number of interface peripherals. The interface peripherals may be used to provide input and output (I/O) to a player tracking system or may be used to provide I/O to other gaming systems such as a gaming machine. The device housing 300 may enclose a logic device (see FIG. 5) and other electronics configured to execute player tracking functions or the logic device may be enclosed in a logic device housing separate from the device housing 300.

Using the player tracking interface devices enclosed in the housing 300, gaming information, such as player tracking information, may be input to the player tracking unit and gaming information may be visually and aurally communicated to various individuals that may use the player tracking unit, such as game players, casino service representatives and maintenance technicians. The device housing 300 encloses a touch screen display 315, a key pad 320, a speaker/microphone 56, a card reader 325, a light 311 adjacent to the card reader 325 and a light 316 adjacent to the touch screen display 315. In other embodiments, the housing 300 may enclose many different combinations of player tracking interface devices. For instance, additional gaming devices, such as biometric input devices (e.g., cameras, retinal scanners, finger print readers), wireless interface devices cameras and bonus buttons, may also be enclosed in the device housing (see FIG. 4B). In one embodiment, face plate 330 surrounds the display 315, the key pad 320, the card reader 325, the light 316, the light 311 and the speaker 56. The face plate 330 may include mounting holes, such as 312, for mounting various player tracking interface devices to the face plate 330 such as the touch screen display 315.

The face plate 330 includes cut-outs (not shown) that may allow access to the player tracking interface devices. For instance, a front portion of the light 316, a front portion of the touch screen display 315, and a front portion of the key pad are visible through the face plate 330. Each of the key pad buttons, such as 321, 322 and 323, may be back-lit by illumination devices of some type. The illumination devices, behind the key pad buttons, may be independently controlled to display various light and color patterns. The light and color patterns may be used to represent game information.

The dimensions of the device housing 300, (e.g. 305, 308 and 310) are shown in FIGS. 2A and 2C. The device housing 300 is shown as a rectangular box for illustrative purposes only. A shape of the device housing 300 is variable and is not strictly limited to rectangular shapes. Further, dimensions of the cut-outs on the face plate 330 for the player tracking interface devices may vary depending the manufacturer of a particular interface peripheral device, which may be used as a player tracking device. Typically, the dimensions of player tracking interface devices vary from manufacturer to manufacturer.

The light 316, adjacent to the touch screen display 315 may use one or more illumination devices. Further, the light 316 may employ one or more types of lighting systems such as light emitting diodes (LED's), neon bulbs, incandescent bulbs, halogen bulbs, florescent bulbs, electro-luminescent lighting elements or combination thereof. In a particular embodiment, the LED's may be multi-colored LED's. The light may extend substantially surround the touch screen display 315 or the light may extend around a portion of the perimeter of the touch screen display. Illumination devices within light 316 may be used to indicate different types of gaming information. For instance, the light 316 may be used to indicate a player has inserted their card incorrectly into the card reader 325. The light 316 may be activated to signal a passing casino service representative to initiate a "point of play registration," as described with reference to FIG. 3E.

The touch screen display 315 may be an LED, LCD, vacuum florescent, plasma display screen or any other type of display technology. The touch screen display 315 may employ one of the touch screen sensors, preferably but not limited to a capacitive sensor, with a touch screen controller integrated into the touch screen assembly as described with reference to FIGS. 2A-2D. The touch screen display 315 may be used to display additional symbols or gaming information that may be used to enhance player tracking services and other related gaming services. For instance, a drink button 322 is used on the key pad 320 for a player to request a drink. Additional drink symbols or text names may be displayed on the touch screen display 315 to allow a player to select a particular type of drink.

Portions of the touch screen display 315 may be used to convey gaming information in a manner similar to the illumination devices. For instance, one or more portions the touch screen display 315, such as a rectangular border around the perimeter of the touch screen display, may flash with various color patterns and symbols as part of an attract mode. Further, one or more portions of the touch screen display may be used to signal machine events. For example, when a player tracking card is inserted correctly in the card reader 325, a portion or all of the touch screen display 315 may light up as green. When a player tracking card is inserted incorrectly in the card reader 325, a portion of the display may light up and flash red. As another example, when a machine malfunction has occurred, a portion of the touch screen display or all of the touch screen display 315 may light up in red. Details of other gaming information (e.g., machine events) which may be provided by illumination devices that may be also may be used with a touch screen display are described in co-pending U.S. application Ser. No. 09/921,489, by Hedrick, et al., filed on Aug. 3, 2001, entitled "Player Tracking Communication Means in a Gaming Machine," which is incorporated herein in its entirety and for all purposes.

FIG. 4B is a front diagram for a housing or chassis 300 enclosing a number of interface peripherals, which may be used as player tracking interface devices, for one embodiment of the present invention. The front plate 330 is covered with a decorative skin 365 with a silk-screen logo 366. In addition to the peripheral interface devices described with respect to FIG. 4A, the player tracking housing 300 includes a wireless interface 364, a camera 362 and a finger-print reader with platen 360. The wireless interface 364 may be compatible with one or more wireless communication standards including but not limited to Bluetooth, IrDA, IEEE 802.11a, IEEE 802.11b, IEEE 802.11x, hiperlan/2, and HomeRF.

In one embodiment, the touch screen display 315 is a color LCD. The touch screen display 315 may be used to implement a game service interface as described with respect to FIGS. 3A-3E. In addition, the touch screen display 315 is used to replace the key pad 320. More specifically, the touch screen display may be used as an interface by a player to: 1) input player tracking identification information, 2) view account information and perform account transactions for accounts such as player tracking accounts and bank accounts, 3) receive operating instructions related to the player tracking unit and the gaming machine, 4) redeem prizes or comps including using player tracking points to redeem the prize or comp (see FIG. 3D), 5) make entertainment service reservations (see FIG. 3C), 6) transfer credits to cashless instruments and other player accounts (see FIG. 3B), 7) participate in casino promotions, 8) select entertainment choices for output via video and audio output mechanisms on the player tracking unit and the gaming machine, 9) play games and bonus games, 10) request gaming services such as a drink orders, 11) communicate with other players or casino service personnel, 12) play progressive games, 13) register a player for a loyalty program such as a player tracking club (see FIG. 3E), 14) perform banking transactions and 15) obtain machine diagnostics. In addition, the touch screen display 315 may be used as an interface by casino service personnel to: a) access diagnostic menus, b) display player tracking unit status information and gaming machine status information, c) access gaming machine metering information (see FIG. 3A) and d) display player status information.

The camera 362 may be used for security purposes, promotional purposes and to enter biometric information. For instance, the camera 362 may deter tampering with a player tracking unit or gaming machine. As another example, a picture of a player may be recorded when they win a jackpot and used for a promotion. As another example, the camera may be used with feature recognition software to identify the player. Similarly, the finger-print reader 360 may be used to read a player's fingerprint, which is used to determine their identity. As another example, the microphone 56 may be used with voice recognition software to recognize a player's voice for player authentication purposes. Thus, a voice signal input into the microphone may be compared with a stored voice print to identify the player. In some embodiments, biometric input devices may be used to supplement information read from a card inserted in the card reader or to even replace the card reader 325.

Biometric information input using the camera 362, finger-print reader 360 or microphone might also be used as part of the "point of play" registration method. For instance, when a player attempts to register for a loyalty program such as a player tracking program at the gaming machine, a picture of the player or a retinal scan may be taken by the camera or a finger print may be recorded using the finger print reader 360. The information may be used for future identification of the player or for security purposes.

The wireless interface 364 may be used to communicate with a portable wireless device worn or carried by a player, a casino service representative or maintenance technician. For example, rather than inserting a card into the card reader 325, a player may wear or simply carry a wireless communication device that may be about the size of a player tracking card. When the player is near the machine, a wireless interface device 364 and the wireless device worn by the player may automatically detect each other and establish communications. The communication connection allows gaming information to be transferred between the wireless devices. As another example, the wireless interface 364 may be used to communicate with a wireless device carried by a casino service representative such as a hand-held device used for a "point of play" registration of a game player at the gaming machine.

The wireless interface device 364 may use a wireless communication standard such as Bluetooth™ to communicate with portable wireless devices using this standard. The Bluetooth communicates on a frequency of 2.45 Gigahertz. Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use 79 or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation takes place to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, such as between the wireless interface device 364 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously. Details of the Bluetooth™ standard and the Bluetooth™ special interest group may be found at www.bluetooth.com. Other wireless standards that may be used with the present invention include but are not limited to IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

In another embodiment of the present invention, the microphone and speaker 56 may be used to input gaming information and aurally communicate gaming information. For instance, the microphone 56 may be used with voice recognition software executed by: a) a logic device on the player tracking unit or b) a master gaming controller in a gaming machine, may be used recognize verbal requests for gaming services. For instance, the player may request a drink by saying, "order me a drink" into the microphone The speaker 56 may be used to aurally communicate gaming information to the player or someone else using the gaming machine. For instance, when a card has been inserted incorrectly in the card reader 325. A message, such as "card not inserted correctly," may be projected from the speaker. Simultaneously, although not required, the light 316 may flash red to draw the player's attention. As another example, as part of a "point of play" registration, a player may be able to speak their name, address and other required information into the microphone 56. The voice information from the player may be used to request a player tracking program registration from a player tracking server as described with respect to FIG. 3E. The voice recognition software may be used in combination with the touch screen display. For example, information entered by the player from speaking may be converted to text and then may be displayed on the touch screen display 315. A game service interface on the touch screen display 315 may be used to correct errors in text converted from a player's voice input.

Voice messages from the speaker 56 may be projected in different languages. For example, for a Japanese speaking game player messages may be in Japanese, for a Spanish speaking game player the messages may be in Spanish while for an English speaking player the messages may be in English. The language preferred by the player may be stored as player tracking information on a player tracking card or the player may be able to specify their language using one of the input devices on the player tracking unit. The player tracking information on the player tracking card may be based on a user profile previously established by the player, which may be used to select the language used by the player.

FIG. 4C is a block diagram of player tracking unit communicating with a hand-held portable device 301 via a wireless interface 364 and wireless communications 382 for one embodiment of the present invention. The wireless communications are used to generate a game service interface, such as the game service interface previously described with respect to FIGS. 3A-3I on the hand-held device 301. The hand-held device may be any type of portable computing device, such as a cell phone, a PDA or a combination cell phone/PDA.

The present invention is not limited to wireless communications. The hand-held device may be connected to the player tracking unit 300 via a wired connection and/or may receive power from the player tracking unit 300. For example, the hand-held device may receive data and/or power via a wired USB connection to the USB port 383.

In one embodiment, the hand-held device may receive a software download used to generate the game service interface on the hand-held device via a communicate connection with the player tracking unit. Further, while logic instructions used to generate the game service interface are executing on the hand-held device, the hand-held device may communicate data needed by interface or generated by the interface to the player tracking unit via the wired or wireless communication connection. For example, the player tracking unit 300 may download software used to generate the jackpot/progressive interface 290 (described with respect to FIG. 3H) or the harm minimization interface 280 (described with respect to FIG. 3G) to the hand-held device. Then, once the software is executing on the device 301, data used by the interface 280, such as personal jackpot information or updated progressive jackpot information, may be communicated from the player tracking unit to the hand-held device 301. Further, data and/or commands generated from the operation of the interface 280, such as a request to display a different progressive jackpot may be communicated from the hand-held device 301 to the player tracking unit and the player tracking unit 300 may respond appropriately to the command/data.

In one embodiment, the hand-held device 301 may be used as a remote control for the player tracking unit 300. For example, using an input mechanism(s) on the hand-held device 301, such as input button 381 or a touch screen on display 380, a game service interface, such as 290, that is displayed on the player tracking unit 300 may be selected. Once the interface 290 is generated on the display 261, the hand-held device may be used to operate the interface 290 and provide any required input into the interface. For example, the interface generated on the player tracking unit 300 may be mirrored on the hand-held device 301 and inputs may be provided to the interface via a touch screen display on the hand-held device. In another example, the input buttons 381 may be used to make selections that appear on the interface, such as 290, generated on the player tracking unit.

In another embodiment, a first game service interface, such as 290, may be generated on the player tracking unit and a second game service interface, 280, may be generated on the hand-held device 300. These two interfaces may be controlled and operated independently of one another via input mechanisms on the player tracking unit, the hand-held device or combinations thereof. In general, in the present invention, any type of content or interface generated on the player tracking unit or the gaming machine may be generated in some form on the hand-held device. The forms may differ because the graphics, memory and computing capabilities of the player tracking unit or gaming machine as compared to the hand-held device differ. For example, simplified version of graphics intensive content or interface displayed on the gaming machine may be displayed on the hand-held device.

The command/control responsibilities may be divided in various ways between the hand-held device and the player tracking unit or the gaming machine. For example, in one embodiment, the hand-held device may operate essentially autonomously of a logic device on the gaming machine by executing software instructions for the interface. While executing the software instructions for the interface, the hand-held device may request and post information to the gaming machine, such as a request for needed data or a post of data/commands. In another example, a logic device on the gaming machine, such as a master gaming controller or a player tracking unit controller, may execute software instructions that allow for sending high level commands to the hand-held device that are translated to low-level commands by the hand-held device. In yet another example, a logic device on the gaming machine may send low-level commands to the hand-held device to directly control a component of the hand-held device, such as a display on the hand-held device.

Additional details of using a remote control device on a gaming machine are described in co-pending U.S. application Ser. No. 10/246,373, by Hedrick, et al., filed Sep. 16, 2002 and titled, "PLAYER TRACKING COMMUNICATION MECHANISMS IN A GAMING MACHINE," which is incorporated herein in its entirety and for all purposes.

FIG. 5 is a block diagram of an embodiment of a player tracking unit 300 of the present invention connected to a master gaming controller 54 (see FIG. 1) on a gaming machine and a player tracking server 62. The player tracking unit 300 includes a logic device 410 and a number of player tracking interface devices 411 including a card reader 325, a display 315, a touch screen 416, a light panel 316, a speaker/microphone 56, a wireless interface and other player tracking interface devices 456.

The logic device 410 may include a processor for executing software allowing the player tracking unit to perform various player tracking functions such as communicating with the player tracking server 62, communicating with the master gaming controller 54 or operating the various peripheral devices such as the card reader 325, the display 315, the touch screen and the light panel 316. For instance, the logic device 410 may send messages containing player tracking information or game service interfaces to the display 315 and may receive input invents from the touch screen 416. As another example, the logic device 410 may send commands to the light panel 316 to display a particular light pattern and to the speaker/microphone 56 to project a sound to visually and aurally convey game information. The logic device 410 may utilize a microprocessor and/or microcontrollers. For instance, the light panel 316 may include a microcontroller that converts signals from the processor 402 to voltage levels for one or more illumination devices. In one embodiment, application software for the player tracking unit 300 and configuration information for the player tracking unit may be stored in a memory device such as an EPROM 408, a non-volatile memory, hard drive or a flash memory.

The player tracking unit may include a memory 416 configured to store: 1) player tracking software 414 such as data collection software, 2) player tracking communication protocols (e.g. 420) allowing the player tracking unit 300 to communicate with different types of player tracking servers, 3) device drivers for many types of player tracking interface devices (e.g. to communicate with the touch screen controller), 4) voice recognition software for receiving voice commands from the microphone 56, 5) software for displaying different game service interfaces, 6) software for generating a "point of play" registration request and 7) industry standard communication protocols (e.g. 440) such as TCP/IP, USB, Firewire, IEEE1394, IrDA or Bluetooth allowing the player tracking unit to communicate with devices using these protocols and proprietary communication standards such as Netplex and SAS (IGT, Reno, Nev.) allowing the player tracking unit to communicate with devices using these protocols. Typically, the master gaming controller, such as 54, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 316 for each type of player tracking device. For example, device drivers for five different types of card readers, six different types of displays and eight different types of touch screens may be stored in the memory 416. When one type of a particular peripheral device is exchanged for another type of the particular device, a new device driver may be loaded from the memory 416 by the processor 402 to allow communication with the device. For instance, one type of card reader in the player tracking unit 300 may be replaced with a second type of card reader where device drivers for both card readers are stored in the memory 416.

In some embodiments, the software units stored in the memory 416 may be upgraded as needed. For instance, when the memory 416 is a hard drive, new device drivers or new communication protocols may be uploaded to the memory from the master gaming controller 54, the player tracking server 62 or from some other external device. As another example, when the memory 416 is a CD/DVD drive containing a CD/DVD designed or configured to store the player tracking software 414, the device drivers and other communication protocols, the software stored in the memory may be upgraded by replacing a first CD/DVD with a second CD/DVD. In yet another example, when the memory 416 uses one or more flash memory units designed or configured to store the player tracking software 414, the device drivers and other communication protocols, the software stored in the flash memory units may be upgraded by replacing one or more flash memory units with new flash memory units storing the upgraded software.

A minimal set of player tracking software applications 414, communication protocols 440, player tracking communication protocols and device drivers may be stored on in the memory 416. For instance, an operating system, a communication protocol allowing the player tracking unit 300 to communicate with a remote server such as the player tracking server 62 and one or more common player tracking applications may be stored in memory 416. When the player tracking unit is powered-up, the player tracking unit 300 may contact a remote server 62 and download specific player tracking software from the remote software. The downloaded software may include but is not limited to one or more particular player tracking applications that are supported by the remote server, particular device drivers, player tracking software upgrades, and a particular communication protocol supported by the remote server. Details of this method are described in co-pending U.S. application Ser. No. 09/838,033, filed on Mar. 19, 2001, by Criss-Puskiewicz, et al., entitled, "UNIVERSAL PLAYER TRACKING SYSTEM," which is incorporated herein in its entirety and all for purposes In some embodiments, the player tracking functions may be implemented by both the logic device 410 and the master gaming controller 54. For instance, the master gaming controller may execute voice recognition software to interpret voice commands input from the microphone 56. As another example, the master gaming controller 54 may execute software for displaying game service interfaces on the display 315 and may receive touch screen events from the touch screen 416. For example, the master gaming controller may execute software for a game service interface allowing a "point of play" registration for a player tracking program. Thus, player tracking software such as the player tracking protocols may be stored on a memory located on the gaming machine, which is separate from the player tracking unit. In some embodiments, the player tracking software stored on the memory on the gaming machine may be executed by the master gaming controller 54 on the gaming machine. In other embodiments, the player tracking software stored on the memory on the gaming machine may be executed by the logic device 410 on the player tracking unit.

The logic device 410 includes a network interface board 406 configured or designed to allow communication between the player tracking unit 300 and other remote devices such as the player tracking server residing on local area networks, such as a casino area network, a personal area network such as a piconet (e.g. using Bluetooth), or a wide area network such as the Internet. The network interface board 406 may allow wireless or wired communication with the remote devices. The network interface board may be connected to a firewall 412. The firewall may be hardware, software or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The communication board 404 may be configured to allow communication between the logic device 410 and the player tracking interface devices including 325, 315, 416, 316, 56 and 456 and to allow communication between the logic device 410 and the master gaming controller 54. Additional details of communication between the processor 402, display 315 and touch screen 416 are described with reference to FIG. 6. The wireless interface 364 may be used to allow the player tracking unit and possibly the master gaming controller 54 to communicate with portable wireless devices or stationary devices using a wireless communication standard. The wireless interface 364 may be connected to an antenna 357. In some embodiments, the wireless interface 364 may be incorporated into the communication board 404. In addition, in some embodiments, the logic device 410 and the master gaming controller 54 may communicate using a non-proprietary standard wireless communication protocol such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF, or using a non-proprietary standard wired communication protocol such as USB, Firewire, IEEE 1394 and the like. In other embodiments, the logic device 410 and the master gaming controller may communicate using a proprietary communication protocol used by the manufacturer of the gaming machine such as Netplex.

The communication between the player tracking unit 400 and 1) the player tracking interface devices 411, 2) the master gaming controller 54, 3) the player tracking server 62 and 4) any other external or internal gaming devices may be encrypted. In one embodiment, the logic device 410 may poll the player tracking interface devices for information. For instance, the logic device 410 may poll the card reader 325 to determine when a card has been inserted into the card reader or may poll the touch screen 416 to determine when the touch screen has been touched. When polled, the touch screen may send the coordinate location of a touch location on the touch screen sensor. In some embodiments, the player tracking interface devices 411 may contact the logic device 410 when a player tracking event such as a card being inserted into the card reader or the touch screen 416 being touched has occurred.

The logic device 410, using an appropriate device driver, may send instructions to the various player tracking interface devices to perform specific operations. For instance, after a card has been inserted into the card reader 325, the processor logic device may send a "read card" instruction to the card reader, "display game service interface A" instructions to the display 315 and a "good luck" voice message to speaker 54. In addition, the logic device 410 may be configured to allow the master gaming controller 54 to send instructions to the player tracking interface devices via the logic device 410. As an example, after a card has been inserted into the card reader 325, the processor logic 410 may determine that the card is for a gaming application controlled by the master gaming controller 54 and send a message to the master gaming controller 54 indicating a card has been inserted into the card reader. For instance, when a player has requested a "point of play registration," a registration interface may be displayed on the main display with a touch screen on the gaming machine rather than on a touch screen display on the player tracking unit. In response, to the message from the logic device, the master gaming controller 54 may send a series of commands to the player tracking interface devices such as a "read card" instruction to the card reader 325, a flash light pattern "A" command to the light panel 316, and a "display message" instruction to the display 315 via the logic device 410. The instructions from the master gaming controller 54 to the player tracking interface devices may be obtained from gaming application software executed by the master gaming controller 54. The gaming application software may or may not be related to player tracking services.

The player tracking unit 300 may include one or more standard peripheral communication connections (not shown). The logic device 410 may be designed or configured to communicate with the master gaming controller 54 and the player tracking interface devices using a standard peripheral connection, such as an USB connector, and using a standard communication protocol, such as USB. Details of using a standard peripheral communication connection are described in co-pending U.S. patent application Ser. No. 09/414,659, filed Oct. 6, 1999, by LeMay, et al., entitled, "STANDARD PERIPHERAL COMMUNICATION," which is incorporated herein in its entirety and for all purposes.

In one embodiment, the peripheral devices 411 on the player tracking unit such as the display 315 and the touch screen 416 may communicate using both wired and wireless communications. For instance, the processor 402 may communicate with the touch screen 416 via a USB connector and using a USB communication protocol. However, the master gaming controller 54 may communicate directly with the touch screen 416 or may communicate with the touch screen 416 through the communication board 404 using a wireless communication protocol such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

FIG. 6 is a block diagram of processor board with a touch screen display in a player tracking unit for one embodiment of the present invention. The player tracking unit communicates with a display 514 and touch screen 516 using a PC-like architecture. The player tracking CPU 402 communicates with memory control chip set 502 and RAM 504 via the local micro-processor bus. A bus interface unit 506 provides an interface between the microprocessor bus and a PCI bus 512 and provides an interface between the microprocessor bus and an ISA bus 522. An Ethernet interface 508 is located on the PCI bus 512. The Ethernet interface allows communication with a local area network (LAN) at 10/100 MB communication rates. The processor 402 may communicate with a player tracking server and other gaming devices located on the LAN via the Ethernet interface 508.

A display controller 510 for the touch screen display 514 is also located on PCI bus 512. The display controller interprets instructions from the processor 402 that allow video content such as game service interfaces, video streaming, games, bonus games, video conferencing, advertising, movies, television programs and web-browsers to be displayed on the display 514. The touch screen controller 518, which is integrated into the touch screen assembly, operates the touch screen sensor, such as by applying a voltage, and interprets touch screen inputs. For example, for a capacitive touch screen sensor, a voltage change in the sensor as the result of a touch may be converted to x and y coordinates or pixel locations by the touch screen controller 518. The touch screen controller sends touch screen event data to an I/O controller 520 via a serial connection 522. The serial connection between the touch screen controller 18 and the I/O controller may be a wire connection that employs USB, RS232, PS/2, Firewire or IEEE 1394 or a wireless connection that employs wireless connection standard such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

The I/O controller 520 sends touch screen events received from the touch screen controller to the bus interface unit 506 via the ISA bus 522 and on to the processor 402. A legacy network interface may be connected to the ISA Bus 522. The legacy network interface allows the processor to communicate with gaming devices connected to the player tracking unit using legacy communication protocols such as fiber optic, current loop (IGT proprietary standard) and RS-485.

Turning to FIG. 7, more details of using a player tracking system in the context of game play on a gaming machine are described. In FIG. 7, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. A touch screen may be mounted over the display monitor 34 and game service interfaces may be displayed on the touch screen monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 1) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments. A secondary display 44, which may also include a touch screen, is mounted in the top box. The secondary display 44 may also be used to operate game service interfaces.

The player tracking unit mounted within the top box 6 includes a touch screen display 22 for entering player tracking information, displaying player tracking information and displaying game service interfaces. The player tracking unit also includes a card reader 24 for entering a magnetic striped card containing player tracking information and a speaker/microphone 42 for projecting sounds and inputting voice data. In addition, the player tracking unit may include additional peripheral interface devices such as biometric input devices as described with respect to FIGS. 4A and 4B.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. As another example, a game may be generated in on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as indicia of credit. As another example, the card reader 24 may accept a debit card or a smart card containing cash or credit information that may be used to register credits on the gaming machine.

Prior to beginning a game play session on the gaming machine 2, a player may insert a player tracking card into the card reader 24 to initiate a player tracking session. In some embodiments, after inserting their card, the player may be visually prompted on the display screen 22 or aurally prompted using the speaker to enter identification information such as a PIN code using the touch screen display 22. Typically, the player tracking card may remain in the card reader 24 during the game play session. As another example, the gaming machine may transfer player tracking information from portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or for "comps" for the player such as free meals or a free room. Usually, the player tracking card inserted into the card reader contains at least player tracking account information. When the card is inserted correctly into the card reader 24, the information stored on the card, such as the player's account information, may be read by the card reader and transferred by a logic device on the player tracking unit (see FIG. 5) to the player tracking server. The player tracking account information allows the player tracking server to store player tracking points accumulated during the game play session to the appropriate account. When player tracking information is not provided by the player, for instance, when the player tracking card has been inserted incorrectly into the card reader 24 or the player is not a member of a player tracking program, player tracking points are not accumulated. However, using the methods described with respect to FIGS. 3E, 9 and 10, when a player is not a member of the player tracking program, the player may register at the gaming machine.

During the course of a game, a player may be required to make a number of decisions, which affect the outcome of the game. For example, a player may vary his or her wager on a particular game, select a prize for a particular game, or make game decisions, which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services or as a receipt for game service transactions made on the gaming machine.

Figure 8:
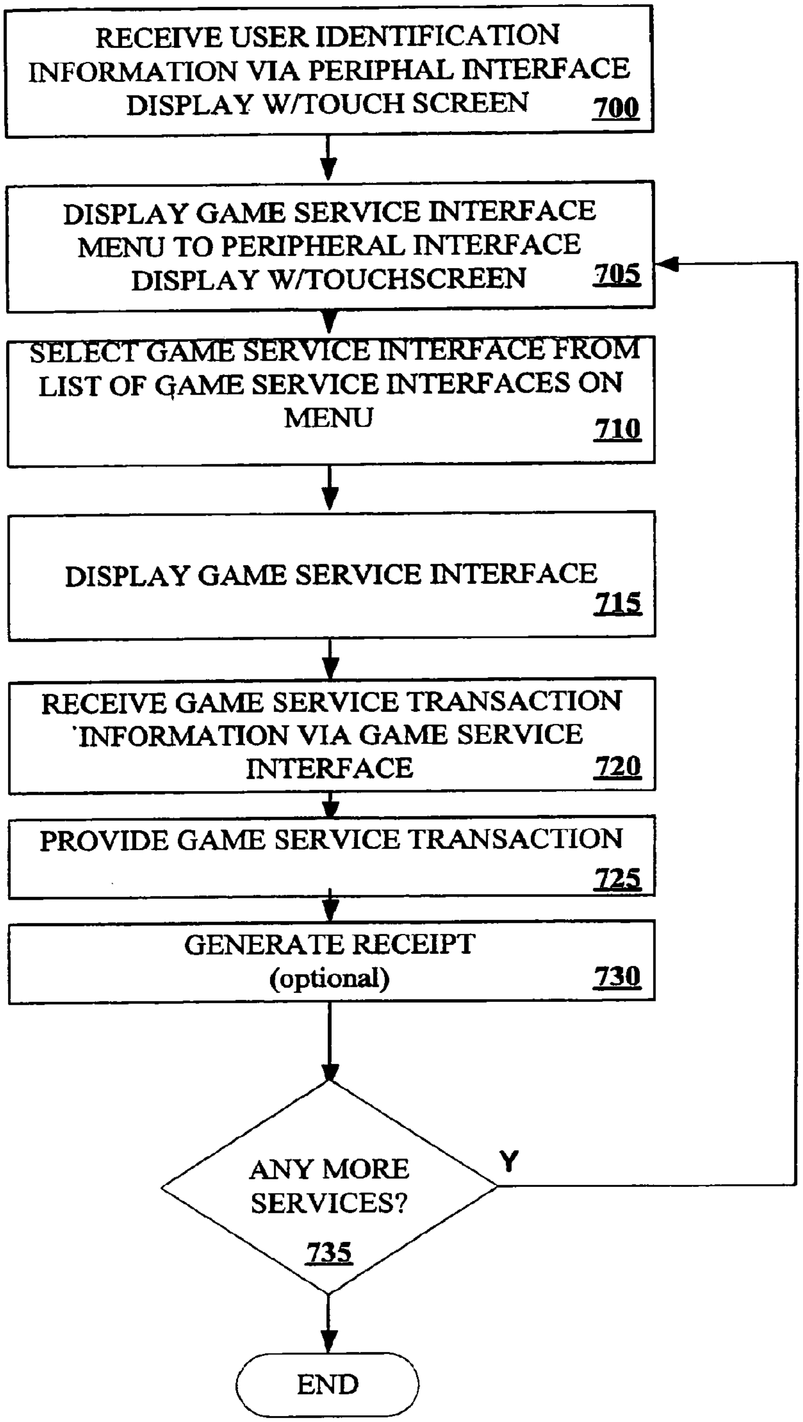
FIG. 8 is a flow chart of a method for providing gaming services on a touch screen display of the present invention.

FIG. 8 is a flow chart of a method for providing gaming services on a touch screen display of the present invention. In 700, a user, such a game player or a casino operator, may enter identification information via a touch screen display. For instance, a PIN number may be entered via a key pad displayed on the touch screen display, a player may "sign-in" by providing a signature via the touch screen display or combinations thereof. In 705, a game service interface menu may be displayed to the touch screen display. The game service interface menu may allow the user to select from a number of game service interfaces available to the user. The game service interface menu may be user specific. For instance, a casino operator may have access to different game service interfaces than a game player. As another example, a "special" status game player, as determined by a gaming establishment, may have access to special game service interfaces not available to every game player.

In 710, a game service interface is selected from the game service interface menu using the touch screen display. In 715, the selected game service interface is displayed. For instance, the selected game service interface may allow a player to join a player tracking program at a gaming machine. In 720, a processor, providing player tracking services, may receive a number of touch screen events via the game service interface that may be converted into game service transaction information. The location of touches on the touch screen display may allow the processor to generate game service transaction information and instructions. For instance, as part of a "point of play registration," a player may type in their name and address by touching the touch screen at locations where different alpha-numeric symbols are displayed.

In 725, based upon information entered by the user, a game service or game service transaction may be provided. As an example of a game service, the user may be able to view selected video content on the touch screen display. As examples of game service transactions, the user may be registered in a player tracking program, redeem a prize, or transfer credits to one or more cashless instruments such as printed ticket. In 730, a receipt may be optionally generated as a record of the game service transaction provided. The receipt may be printed on a printer located on the gaming machine. As examples, the receipt may be a coupon for a promotion requested by the player or an entertainment reservation made by the player. In 735, the user may have the option to request access to another game service interface. When the user requests access to another game service interface, the game service interface menu may be re-displayed according to 705.

FIG. 9 is a flow chart of a method for providing a "point of play" loyalty program registration on a gaming machine of the present invention. In FIG. 9, the method is implemented on a gaming machine. However, as described with respect to FIG. 3E, the method may be implemented on gaming devices such as a hand-held wireless device or a casino kiosk. In 800, a request to register a player for a loyalty program is detected.

The registration request may be initiated using a touch screen interface located on a player tracking display, main display or secondary display on the gaming machine. Further, the registration request may be initiated using another input mechanism on the gaming machine such as input buttons or a key pad available on the gaming machine. In one embodiment, the registration request may be initiated automatically by the gaming machine. For instance, when a player is not involved in a player tracking session during a game play session on the gaming machine, the gaming machine may initiate a registration request based upon the amount a player has wagered over a time period during the game play session. The gaming machine may initiate the request by displaying a message to the player asking them if they would like to register for a loyalty program.

In 805, a game service interface is displayed on a touch screen peripheral interface available on the gaming machine such as on but not limited to the player tracking unit. In 810, information from a loyalty program instrument such as a magnetic striped card, smart card, room key or a portable wireless device may be read into to the gaming machine. For instance, in one embodiment, to register for a player tracking program, a blank magnetic striped card may be inserted into a card reader on the gaming machine to read a serial number on the card. In 815, the user may enter identification information, such as a name and address, via the registration touch screen interface which is received by a processor located on the gaming machine such as in the player tracking unit or in the master gaming controller. When the user has completed entering the information, an input button on the touch screen display such as "register" button may be touched (see FIG. 3E).

In 818, the information entered by the user is checked. In 816, when additional information is required, a message may be sent to the touch screen display with a request for the missing information. In 820, when the user has entered the required registration information, a registration request message is generated by a processor on the gaming machine and sent to a playing tracking server. The registration request message may include player identification information and information obtained from the loyalty program instrument such as the serial number from the magnetic striped card. In some embodiments, the network connection to the player tracking server may be unavailable. In this case, the processor may store the registration request message and send it when the player tracking server becomes available.

In 825, the gaming machine receives a registration reply from the player tracking server. In 830, the gaming machine determines if the registration has been confirmed from the registration reply message. In 845, when the registration has not been confirmed, a message may be displayed to the player indicating the registration request was denied with a reason for the denial. For instance, the registration may be denied because the player is already registered for the player tracking program. In 833, when the player tracking server has confirmed the registration, a confirmation message may be displayed to the player and a player tracking session may be initiated on the gaming machine 840. In 835, a receipt indicating the registration has occurred may be generated by the gaming machine.

After registration, the player may use the registered loyalty program instrument, such as a magnetic striped card, PDA (personal digital assistant), cell phone, room key or smart card, at other gaming machines to initiate a loyalty program sessions such as player tracking sessions. In some embodiments, the loyalty program instrument used during the registration process may be a permanent membership card that may be used by the player to participate in the loyalty program. In other embodiments, the loyalty program instrument used during the registration may be temporarily used by the player until a permanent membership card is mailed to the player.

FIG. 10 is a flow chart of a method for providing a "point of play" loyalty program registration on a player tracking server of the present invention. In 900, the player tracking server receives a registration request message from a gaming device. The gaming device may be at least one of a gaming machine, casino kiosk or hand-held wireless device. The sent message may be encrypted by the gaming device and then decrypted by the player tracking server. The message contents and the message sender may also be validated in some manner before the registration request is processed. In 905, the player tracking server may compare identification information and instrument information contained in the registration request message with information stored in a player tracking database. In 910, the player tracking server may determine if the player is already a member of the player tracking program. In 915, when the player is already registered, a registration reply message may be generated and sent to the gaming device indicating that the registration was denied because the player is already a member of the program.

In 920, when the player is not a member of the player tracking program, the player tracking server may generate a new player tracking account using the player identification information and loyalty program instrument information contained in the registration request message. The identification information may include biometric information such as scanned finger-print, picture, voice print or signature that may be stored in the new player tracking account. In 925, a registration reply message, which includes a confirmation of the registration, is generated by the player tracking server and sent to the gaming device. In 930, a PIN number may later be sent to the player.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. For example, gaming machine may be provided without a top box or the gaming machine may be of a slant-top or a table top design.

What is claimed is:

1. A gaming machine comprising:
a housing;
a plurality of input devices supported by the housing, said plurality of input devices including:
(i) an acceptor, and
(ii) a cashout device;
at least one display device supported by the housing;
a master gaming controller;
at least one memory device which stores a plurality of instructions, which when executed by the master gaming controller, cause the master gaming controller to operate with the at least one display device and the plurality of input devices to:
(a) if a physical item is received via the acceptor, establish a credit balance based, at least in part, on a monetary value associated with the received physical item,
(b) switch between a first operational mode and a second operational mode based on at least one player input which is independent of an amount of any wager placed on a play of a game of chance, wherein:
(i) in the first operational mode, the game of chance includes a chance to win a wide area progressive jackpot, said wide area progressive jackpot being a maximum award for the game of chance, and wherein a portion of each wager placed while in the first operational mode is contributed to the wide area progressive jackpot, and
(ii) in the second operational mode, the game of chance does not include the chance to win the wide area progressive jackpot and no contribution is made to the wide area progressive jackpot,
(c) display an outcome of the play of the game of chance,
(d) if a cashout input is received via the cashout device, cause an initiation of any payout associated with the credit balance; and
a network interface coupled to the master gaming controller and configured to send a message over a network regarding the portion of each wager contributed to the wide area progressive jackpot while in the first operational mode.

2. The gaming machine of claim 1, wherein when executed by the master gaming controller, the plurality of instructions cause the master gaming controller to establish a communication session with a remote gaming device that enables a notification to be communicated to the remote gaming device of contributions to the wide area progressive jackpot when in the first operational mode or when switched from the second operational mode to the first operational mode.

3. The gaming machine of claim 2, wherein the remote gaming device polls for contributions to the remote gaming device.

4. The gaming machine of claim 1, wherein when executed by the master gaming controller, the plurality of instructions cause the master gaming controller to terminate a communication session with a remote gaming device that determines an amount of the wide area progressive jackpot and that receives information indicating contributions to the wide area progressive jackpot when switched from the first operational mode to the second operational mode.

5. The gaming machine of claim 1, wherein when executed by the master gaming controller after a switch between the first operational mode and the second operational mode, the plurality of instructions cause the master gaming controller to change at least one of: a theme of the game of chance, a plurality of graphics of the game of chance, a plurality of sounds of the game of chance, a paytable of the game of chance, and game software of the game of chance.

6. The gaming machine of claim 5, wherein the at least one of the plurality of graphics of the game of chance, the plurality of sounds of the game of chance, the paytable of the game of chance, and the game software of the game of chance is downloaded from a remote gaming device.

7. The gaming machine of claim 1, wherein all or a portion of the game of chance displayed on the at least one display device is generated on a remote gaming device.

8. The gaming machine of claim 1, wherein when executed by the master gaming controller, the plurality of instructions cause the master gaming controller to:

receive a video stream of a presentation for the game chance from a remote gaming device, and display the video stream.

9. The gaming machine of claim 1, wherein when executed by the master gaming controller, the plurality of instructions cause the master gaming controller to:

display a plurality of different types of games of chance available for play wherein a portion of the plurality of different types of games of chance include the chance to win the wide area progressive jackpot, and receive an input for selecting one of the plurality of different types of games of chance.

10. The gaming machine of claim 9, where the input for selecting one of the plurality of different types of games of chance triggers a switch between the first operational mode and the second operational mode.

11. The gaming machine of claim 9, wherein at least one of: the display of the plurality of different types of games of chance available for play and the input for selecting one of the plurality of different types of games of chance is made via a player tracking unit supported by the housing.

12. The gaming machine of claim 1, wherein when executed by the master gaming controller, the plurality of instructions cause the master gaming controller to switch from a first paytable to a second paytable wherein the paytables are not dynamically generated and are pre-approved for use prior to the switch.

13. The gaming machine of claim 1, wherein the game of chance is selected from the group consisting of: a bingo game, a centrally determined game, a card game, a slot game, a dice game, a poker game, a pachinko games, a multiple hand poker game, a pai-gow poker game, a blackjack games, a keno game, a roulette game, a craps game, a game of checkers and a board game.

14. The gaming machine of claim 1, wherein when executed by the master gaming controller, the plurality of instructions cause the master gaming controller to instantiate and control at least two game play interfaces wherein separate wagers are received for each game of chance played in each game play interface.

15. The gaming machine of claim 14, wherein each game of chance played in each game play interface is generated independently and played independently.

16. The gaming machine of claim 14, wherein, when at least two game play interfaces are simultaneously instantiated, the at least two games of chance are played concurrently.

17. The gaming machine of claim 14, wherein each of the game play interfaces is operated in the first operational mode or the second operational mode.

18. The gaming machine of claim 17, wherein each of the game play interfaces can be switched between the first operational mode and the second operational mode.

19. The gaming machine of claim 1, which includes another display device configured to display an amount of the wide area progressive jackpot.

20. The gaming machine of claim 1, wherein an amount of the wide area progressive jackpot is displayed on the at least one display device.

21. The gaming machine of claim 1, wherein when executed by the master gaming controller, the plurality of instructions cause the master gaming controller to:

receive messages indicating an amount of the wide area progressive jackpot, and display the amount of the wide area progressive jackpot.

22. The gaming machine of claim 1, when executed by the master gaming controller when in the first operational mode, the plurality of instructions cause the master gaming controller to switch between a first game of chance including a first wide area progressive jackpot and a second game of chance including a second wide area progressive jackpot.

23. The gaming machine of claim 22, wherein when executed by the master gaming controller, the plurality of instructions cause the master gaming controller to:

direct a first contribution to the first wide area progressive jackpot when the wager is made on the first game of chance, and direct a second contribution to the second wide area progressive jackpot when the wager is made on the second game of chance.

24. The gaming machine of claim 22, wherein when executed by the master gaming controller, the plurality of instructions cause the master gaming controller to:

receive updates of an amount of the first wide area progressive jackpot from a first remote gaming device, and receive updates of an amount of the second wide area progressive jackpot from a second remote gaming device.

* * * * *